(12) United States Patent
Valenti, Jr. et al.

(10) Patent No.: US 10,460,631 B1
(45) Date of Patent: Oct. 29, 2019

(54) PRIVACY LABEL

(71) Applicant: Chicago Tag & Label, Inc., Libertyville, IL (US)

(72) Inventors: F. Paul Valenti, Jr., Barrington, IL (US); Carl Opel, Carol Stream, IL (US); Daniel Hedger, Grayslake, IL (US)

(73) Assignee: Chicago Tag & Label, Inc., Libertyville, IL (US)

( * ) Notice: Subject to any disclaimer, the term of this patent is extended or adjusted under 35 U.S.C. 154(b) by 0 days.

(21) Appl. No.: 15/460,709

(22) Filed: Mar. 16, 2017

Related U.S. Application Data

(60) Provisional application No. 62/356,944, filed on Jun. 30, 2016, provisional application No. 62/309,992, filed on Mar. 18, 2016.

(51) Int. Cl.
*G09F 3/00* (2006.01)
*G09F 3/10* (2006.01)
*B32B 7/12* (2006.01)
*G09F 3/02* (2006.01)

(52) U.S. Cl.
CPC .............. *G09F 3/0288* (2013.01); *B32B 7/12* (2013.01); *G09F 3/10* (2013.01); *B32B 2519/00* (2013.01); *G09F 2003/0201* (2013.01); *G09F 2003/0222* (2013.01); *G09F 2003/0269* (2013.01); *G09F 2003/0272* (2013.01); *Y10T 428/14* (2015.01); *Y10T 428/15* (2015.01)

(58) Field of Classification Search
CPC .. G09F 3/0288; G09F 3/10; G09F 2003/0201; G09F 2003/0222; G09F 2003/0269; G09F 2003/0272; B32B 7/12; B32B 2519/00; Y10T 428/15
USPC ........................................................ 428/43
See application file for complete search history.

(56) References Cited

U.S. PATENT DOCUMENTS

| | | | | |
|---|---|---|---|---|
| 4,700,976 A * | 10/1987 | Loose | .................... | G09F 3/0288 156/204 |
| 4,910,058 A * | 3/1990 | Jameson | ................ | G09F 3/0288 283/101 |
| 5,900,610 A * | 5/1999 | Kelly, Jr. | ............ | G06K 17/0029 235/375 |
| 7,166,345 B2 | 1/2007 | Myers et al. | | |
| 7,758,080 B1 * | 7/2010 | Vidler | .................... | B42D 15/00 283/81 |
| 8,979,133 B2 * | 3/2015 | Vidler | .................... | B42D 15/00 283/100 |
| 2001/0007703 A1 | 7/2001 | Weirather et al. | | |
| 2005/0196573 A1 * | 9/2005 | Myers | .................... | G09F 3/0292 428/40.1 |
| 2008/0102238 A1 | 5/2008 | Swords | | |

* cited by examiner

*Primary Examiner* — Patricia L. Nordmeyer
(74) *Attorney, Agent, or Firm* — Ice Miller LLP

(57) ABSTRACT

A privacy label includes a label sheet having a top surface and an adhesive underside surface. The top surface is adapted for printing indicia thereon. The label sheet includes a line of weakness dividing the label sheet into two adjacent segments. Each segment is separable from the other along the line of weakness. Removing one of the segments from the other renders indicia printed on the label sheet incoherent.

17 Claims, 21 Drawing Sheets

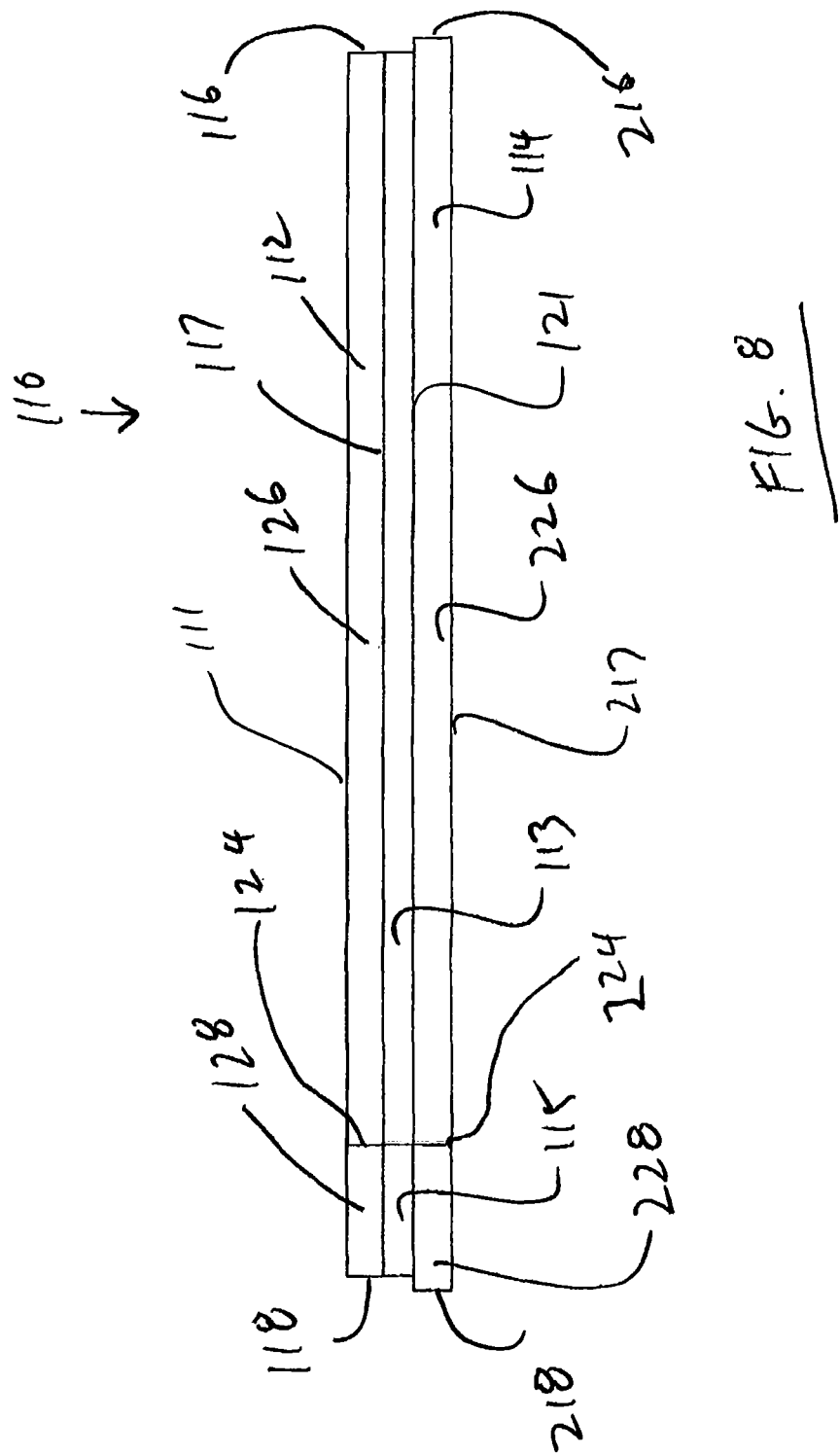

PRIVACY LABEL

CROSS-REFERENCE TO RELATED APPLICATIONS

The present application is a non-provisional of, and claims priority to, U.S. Provisional patent application Ser. No. 62/309,992, filed Mar. 18, 2016, and having the title "PRIVACY LABEL," and is a non-provisional of, and claims priority to, U.S. Provisional Patent Application No. 62/356,944, filed Jun. 30, 2016, and having the title "PRIVACY LABEL." The disclosures of both of these applications are incorporated by reference.

BACKGROUND

Medical charts, medical devices, medication containers, and other objects used in the care of a patient normally are labeled to ensure that the patient receives the intended medical care. Patient identification can be accomplished by attaching a patient-specific label to such medical charts, medical devices, medication containers, and other objects used in the care of a patient. Laws concerning privacy of medical patient information, such as the Health Insurance Portability and Accountability Act ("HIPAA"), require health care providers to obscure information about a patient's identity before disposing of any materials associated with the patient. It is desired to provide an improved form of label to facilitate hiding information about a patient's identity before disposing of materials associated with a medical patient.

SUMMARY

The present disclosure includes disclosure of a embodiments of a privacy label. In at least one embodiment, a privacy label according to the present disclosure comprises a label sheet, the label sheet comprising a top surface adapted for printing indicia thereon and an underside surface opposite the top surface, the label sheet comprising an edge defining a boundary of the label sheet, the label sheet comprising a line of weakness defining a first segment and a second segment in the label sheet, the line of weakness originating at the edge of the label sheet and terminating at the same edge of the label sheet, the first segment and the second segment together defining an area for printing the indicia thereon, the first segment being separable from the second segment along the line of weakness; and an adhesive covering at least a majority of the underside surface of the first segment, wherein the underside surface of the second segment is substantially free of adhesive; wherein when the second segment is removed from the first segment, the indicia printed on the top surface of the label sheet is rendered incoherent. In an aspect of a privacy label according to the present disclosure, the privacy label further comprises a liner sheet, the liner sheet comprising a first surface and a second surface opposite the first surface, the first surface of the liner sheet comprising a release coating, the first surface of the liner sheet removably adhered to the underside surface of the first segment of the label sheet.

In at least one embodiment, a privacy label according to the present disclosure comprises a label sheet, the label sheet comprising a top surface adapted for printing indicia thereon and an underside surface opposite the top surface, the label sheet comprising an edge defining a boundary of the label sheet, the label sheet comprising a line of weakness defining a first segment and a second segment in the label sheet, the line of weakness originating at the edge of the label sheet and terminating at the same edge of the label sheet, the first segment and the second segment together defining an area for printing the indicia thereon, the first segment being separable from the second segment along the line of weakness; a first adhesive covering at least a majority of the underside surface of the first segment; and a second adhesive covering at least a portion of the underside surface of the second segment; wherein the second adhesive comprises weaker adherence properties than the first adhesive, and wherein when the second segment is removed from the first segment, the indicia printed on the top surface of the label sheet is rendered incoherent. In an aspect of a privacy label according to the present disclosure, the privacy label further comprises a liner sheet, the liner sheet comprising a first surface and a second surface opposite the first surface, the first surface of the liner sheet comprising a release coating, the first surface of the liner sheet removably adhered to the underside surface of the label sheet.

In at least one embodiment, a privacy label according to the present disclosure comprises a liner sheet, the liner sheet comprising a first surface and a second surface opposite the first surface, the liner sheet comprising a liner sheet line of weakness defining a first sector and a second sector in the liner sheet, the first sector being separable from the second sector along the liner sheet line of weakness; a label sheet, the label sheet comprising a top surface adapted for printing indicia thereon and an underside surface opposite the top surface, the label sheet comprising a label sheet line of weakness defining a first segment and a second segment in the label sheet, the first segment and the second segment together defining an area for printing the indicia thereon, the first segment being separable from the second segment along the label sheet line of weakness; a first adhesive between the liner sheet and the label sheet, the first adhesive covering at least a majority of the underside surface of the first segment and removably adhering the underside surface of the first segment of the label sheet to the first surface of the first sector of the liner sheet; and a second adhesive between the liner sheet and the label sheet, the second adhesive covering at least a portion of the underside surface of the second segment and adhering the underside surface of the second segment of the label sheet to the first surface of the second sector of the liner sheet; wherein when the label sheet is separated from the liner sheet, the second sector of the liner sheet disconnects from the first sector of the liner sheet at the liner sheet line of weakness with the second sector of the liner sheet remaining adhered to the underside surface of the second segment of the label sheet and the second adhesive being concealed between the second segment of the label sheet and the first surface of the second sector of the liner sheet, and the first adhesive on the underside surface of the first segment is exposed; and wherein when the second segment of the label sheet is removed from the first segment of the label sheet, the second sector of the liner sheet remains adhered to the underside surface of the second segment of the label sheet; and wherein when the second segment of the label sheet is removed from the first segment of the label sheet, the indicia printed on the top surface of the label sheet is rendered incoherent. In an aspect of a privacy label according to the present disclosure, the first adhesive and the second adhesive comprise the same material. In an aspect of a privacy label according to the present disclosure, the label sheet line of weakness overlies the liner sheet line of weakness. In an aspect of a privacy label according to the present disclosure, the label sheet line of weakness does not overlie the liner sheet line of weakness. In an aspect of a privacy label according to the present disclosure, the label sheet comprises an edge, and wherein the label sheet line of weakness originates at the edge of the label sheet and terminate at the same edge of the label sheet. In an aspect of a privacy label according to the present disclosure, the label sheet comprises a margin, and wherein the liner sheet line of weakness originates at the margin of the liner sheet and terminates at the same margin of the liner sheet. In an aspect of a privacy label according to the present disclosure, the label sheet comprises one or more edges defining a boundary of the label sheet, and wherein the label sheet line of weakness does not intersect with any of the one or more edges of the label sheet. In an aspect of a privacy label according to the present disclosure, the liner sheet comprises one or more margins defining a boundary of the liner sheet, and wherein the liner sheet line of weakness does not intersect with any of the one or more margins of the liner sheet.

In at least one embodiment, a privacy label according to the present disclosure comprises a liner sheet, the liner sheet comprising a first surface and a second surface opposite the first surface; a label sheet, the label sheet comprising a top surface, an underside surface opposite the top surface, and one or more edges defining a boundary of the label sheet, the top surface adapted for printing indicia thereon, the label sheet comprising a line of weakness defining a first segment and a second segment in the label sheet, the first segment and the second segment together defining an area for printing the indicia thereon, the first segment being separable from the second segment along the line of weakness, the underside surface of the label sheet comprising a first adhesive, wherein a portion of the underside surface of the label sheet is releasably bonded to the first surface of the liner sheet; an intermediate sheet between the liner sheet and the label sheet, the intermediate sheet comprising an upper surface and a lower surface opposite the upper surface, the lower surface of the intermediate sheet comprising a second adhesive, wherein the upper surface of the intermediate sheet is releasably bonded to the underside surface of the label sheet in a position underlying all of the second segment of the label sheet, and wherein the lower surface of the intermediate sheet is releasably bonded to the first surface of the liner sheet; wherein when the label sheet is separated from the liner sheet, the intermediate sheet remains adhered to the underside surface of the second segment of the label sheet and the first adhesive and the second adhesive are exposed; and wherein when the second segment of the label sheet is removed from the first segment of the label sheet, the intermediate sheet remains adhered to the underside surface of the second segment of the label sheet; and wherein when the second segment of the label sheet is removed from the first segment of the label sheet, the indicia printed on the top surface of the label sheet is rendered incoherent. In an aspect of a privacy label according to the present disclosure, the label sheet comprises an edge, and wherein the line of weakness originates at the edge of the label sheet and terminate at the same edge of the label sheet. In an aspect of a privacy label according to the present disclosure, the label sheet comprises one or more edges defining a boundary of the label sheet, and wherein the line of weakness does not intersect with any of the one or more edges of the label sheet.

BRIEF DESCRIPTION OF THE DRAWINGS

The features and advantages of this disclosure, and the manner of attaining them, will be more apparent and better understood by reference to the following descriptions of the disclosed methods and systems, taken in conjunction with the accompanying drawings, wherein:

FIG. 8 shows a cross-sectional view of a privacy label according to at least one embodiment of the present disclosure.

DESCRIPTION

Figure 1:
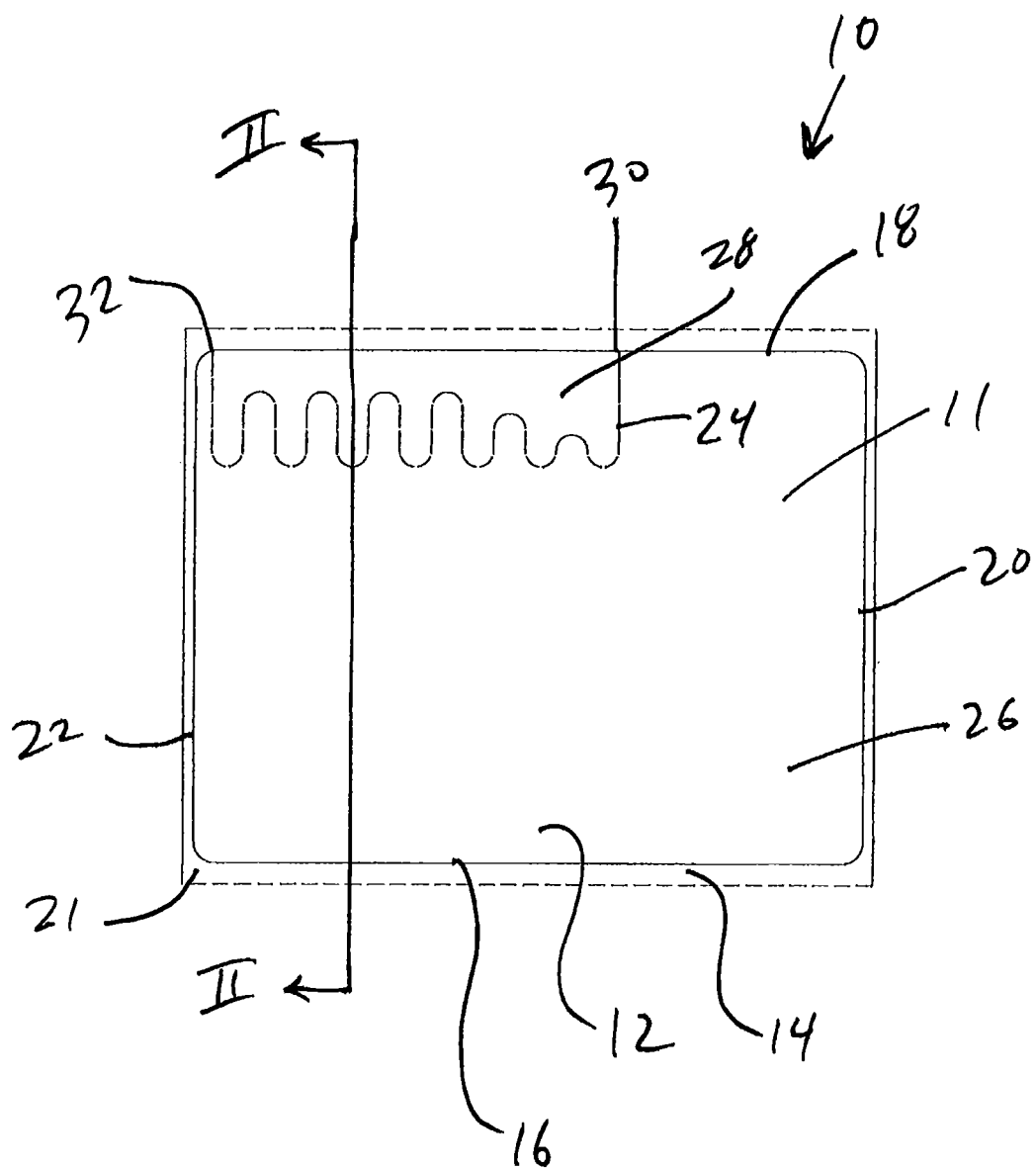
FIG. 1 shows a top view of a privacy label according to at least one embodiment of the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 shows a top view of privacy label 10 according to at least one embodiment of the present disclosure. As shown in FIG. 1, privacy label 10 comprises label sheet 12, which is removably adhered to liner sheet 14. Label sheet 12 is bounded by bottom edge 16, top edge 18, and side edges 20, 22, and comprises a top side 11 and an underside 17 (not shown in FIG. 1). Liner sheet 14 comprises a first surface 21 facing and removably adhered to underside 17 of label sheet 12. In at least one embodiment of the present disclosure, label sheet 12 comprises a material suitable for the printing of indicia thereon, such as, for example, paper, polyester, or another polymer material. In at least one embodiment of the present disclosure, liner sheet 14 comprises a release coating (not shown), such as, for example, a silicone, on at least a portion of first surface 21 facing label sheet 12.

In the embodiment of privacy label 10 shown in FIG. 1, line of weakness 24 extends through label sheet 12, but not through liner sheet 14. Line of weakness 24 divides label sheet 12 into first segment 26 and second segment 28. In at least one embodiment of the present disclosure, line of weakness 24 has a curvilinear shape. In at least one embodiment of the present disclosure, line of weakness 24 begins at top edge 18 (shown as intersection point 30 in FIG. 1), and also terminates at top edge 18 (shown as intersection point 32 in FIG. 1). In at least one embodiment of the present disclosure, line of weakness 24 comprises a series of perforations. In at least one embodiment of the present disclosure, line of weakness 24 comprises a die cut.

Figure 2:
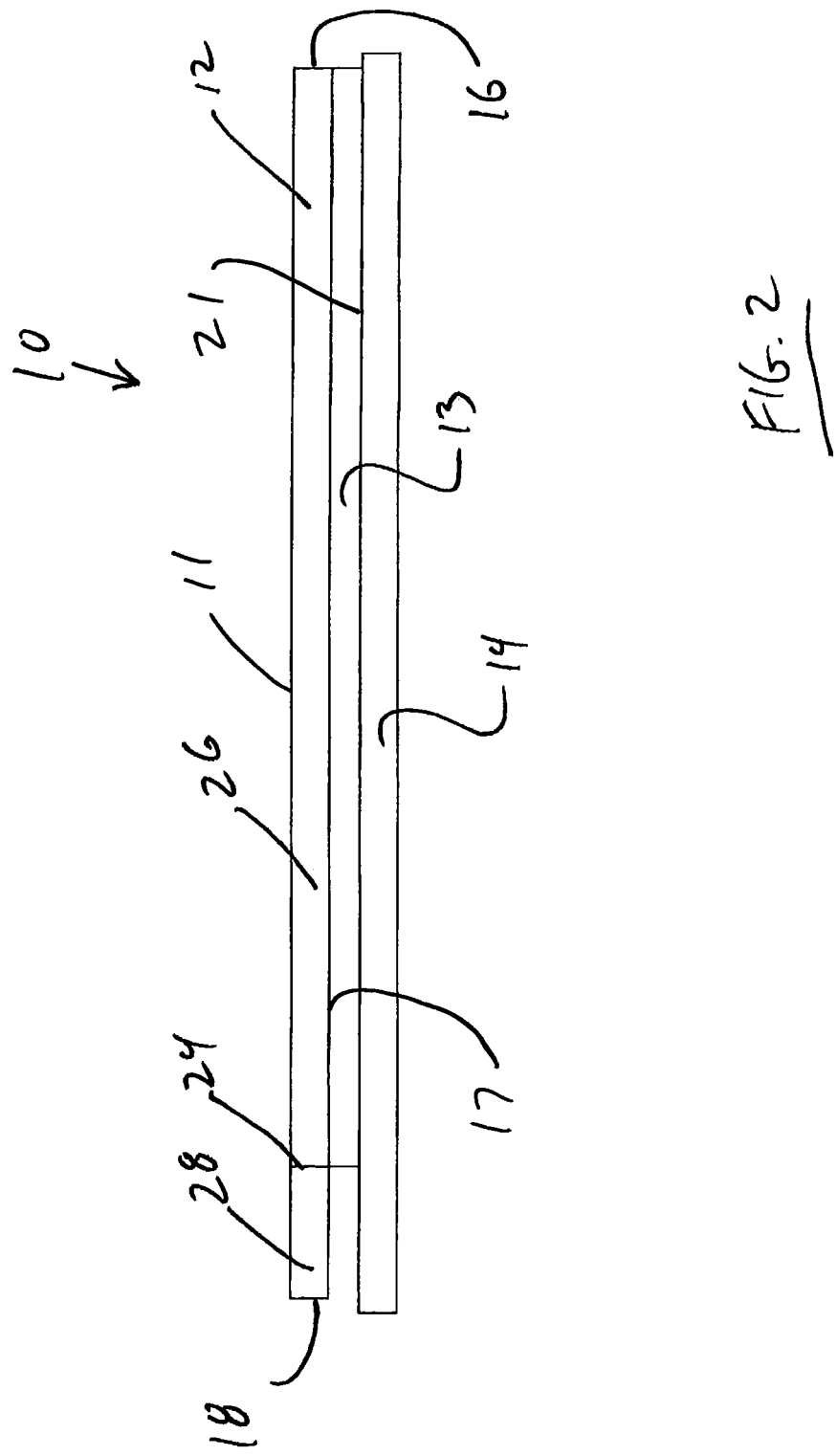
FIG. 2 shows a cross-sectional view of a privacy label according to at least one embodiment of the present disclosure.

FIG. 2 shows a cross-sectional view of at least one embodiment of privacy label 10, taken along line II-II of FIG. 1. In the embodiment of privacy label 10 shown in FIG. 2, line of weakness 24 extends through label sheet 12, but not through liner sheet 14. Also as shown in FIG. 2, adhesive 13 is interposed between label sheet 12 and liner sheet 14 in the area underlying first segment 26. However, the area between label sheet 12 and liner sheet 14 underlying second segment 28 is free of or substantially free of adhesive. Adhesive 13 is permanently adhered to label sheet 12 in the area underlying first segment 26. However, the release coating (not shown) on liner sheet 14 permits removal of label sheet 12 and adhesive 13 from liner sheet 14.

Figure 3:
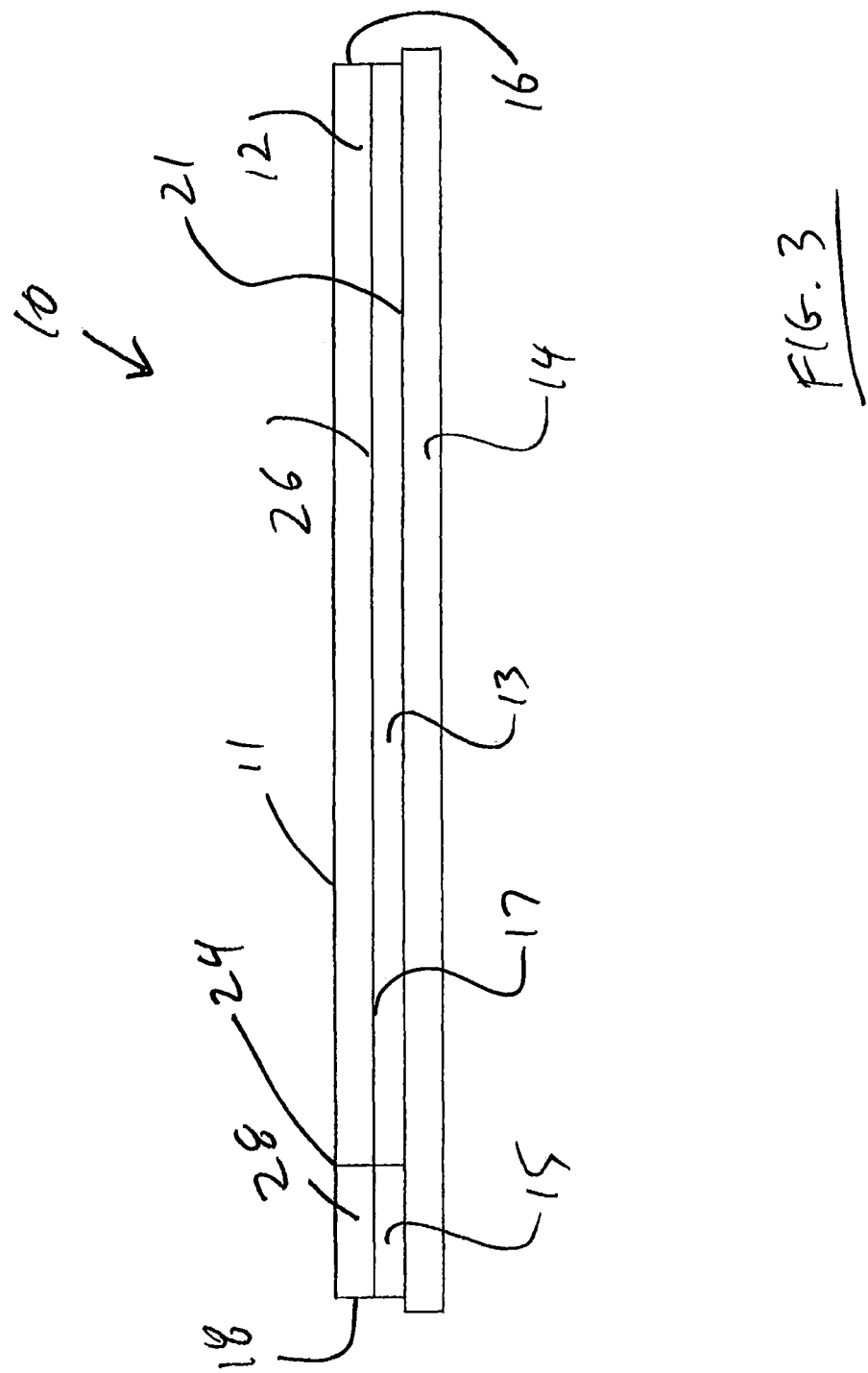
FIG. 3 shows a cross-sectional view of a privacy label according to at least one embodiment of the present disclosure.

FIG. 3 shows a cross-sectional view of at least one other embodiment of privacy label 10, also taken along line II-II of FIG. 1. In the embodiment of privacy label 10 shown in FIG. 3, line of weakness 24 extends through label sheet 12, but not through liner sheet 14. Also as shown in FIG. 3, adhesive 13 is interposed between label sheet 12 and liner sheet 14 in the area underlying first segment 26. As shown in FIG. 3, a second adhesive 15 is interposed between label sheet 12 and liner sheet 14 in the area underlying second segment 28. Adhesive 13 is permanently adhered to label sheet 12 in the area underlying first segment 26. The release coating (not shown) on liner sheet 14 permits removal of label sheet 12 and adhesive 13 from liner sheet 14. Adhesive 15 also is permanently adhered to label sheet 12 in the area underlying second segment 28. The release coating (not shown) on liner sheet 14 permits removal of label sheet 12 and adhesive 15 from liner sheet 14. In at least one embodiment of the present disclosure, adhesive 15 comprises weaker adherence properties than adhesive 13. Accordingly when such an embodiment of privacy label 10 is used (as discussed hereinafter), the area underlying second segment 28 will be more weakly adhered to the surface to which it is attached than the area underlying first segment 26.

Figure 4:
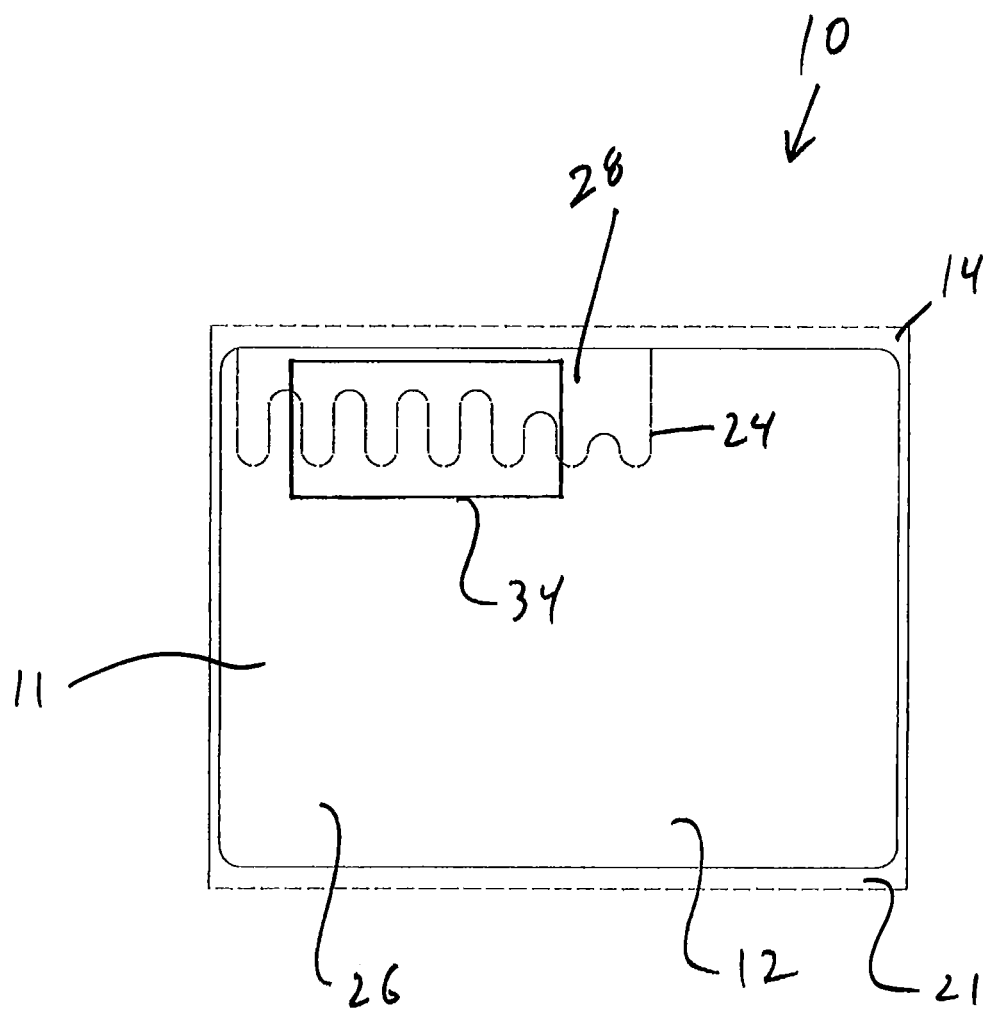
FIG. 4 shows a top view of a privacy label according to at least one embodiment of the present disclosure.

FIG. 4 shows a top view of privacy label 10 according to at least one embodiment of the present disclosure. Where such an embodiment of privacy label 10 is used, indicia, such as, for example, patient-specific indicia regarding a medical patient, is printed on an indicia-friendly surface of label sheet 12 in a fashion that intersects line of weakness 24. For example, in at least one embodiment of the present disclosure, such indicia would be printed within the area denoted by box 34 in FIG. 4. Accordingly, a portion of such indicia would appear within first segment 26, and a portion of such indicia would appear within second segment 28.

According to the present disclosure, label sheet 12 with indicia thereon may be removed from liner sheet 14 and adhered to a surface of an object such as a medical chart, medical device, medication container, and the like. Where the embodiment of privacy label 10 is free of or substantially free of adhesive in the area of label sheet 12 underlying second segment 28 (such as is shown in FIG. 2), adhesive 13 underlying first segment 26 adheres to the surface, but second segment 28 is not adhered to the surface. Where the embodiment of privacy label 10 comprises a weaker adhesive 15 in the area of label sheet 12 underlying second segment 28 (such as is shown in FIG. 3), adhesive 13 underlying first segment 26 adheres to the surface, and adhesive 15 underlying second segment 28 also adheres to the surface, albeit more weakly.

When the object is to be disposed of, because second segment 28 either is not adhered to the surface or is only weakly adhered to the surface, second segment 28 may be readily separated from first segment 26 at line of weakness 24 and removed. Second segment 28 then may be disposed of in a fashion that complies with the relevant laws concerning privacy of medical information. Separating second segment 28 from first segment 26 at line of weakness 24 destroys the coherence of the indicia on label sheet 12, as the portion of such indicia appearing within second segment 28 no longer is present. After second segment 28 is removed, first segment 26 remains adhered to the surface of the object, but the portion of the indicia appearing within first segment 26 is made unintelligible though the removal of second segment 28. The object, including first segment 26, also may then be disposed of in a fashion that complies with the relevant laws concerning privacy of medical information.

Figure 5:
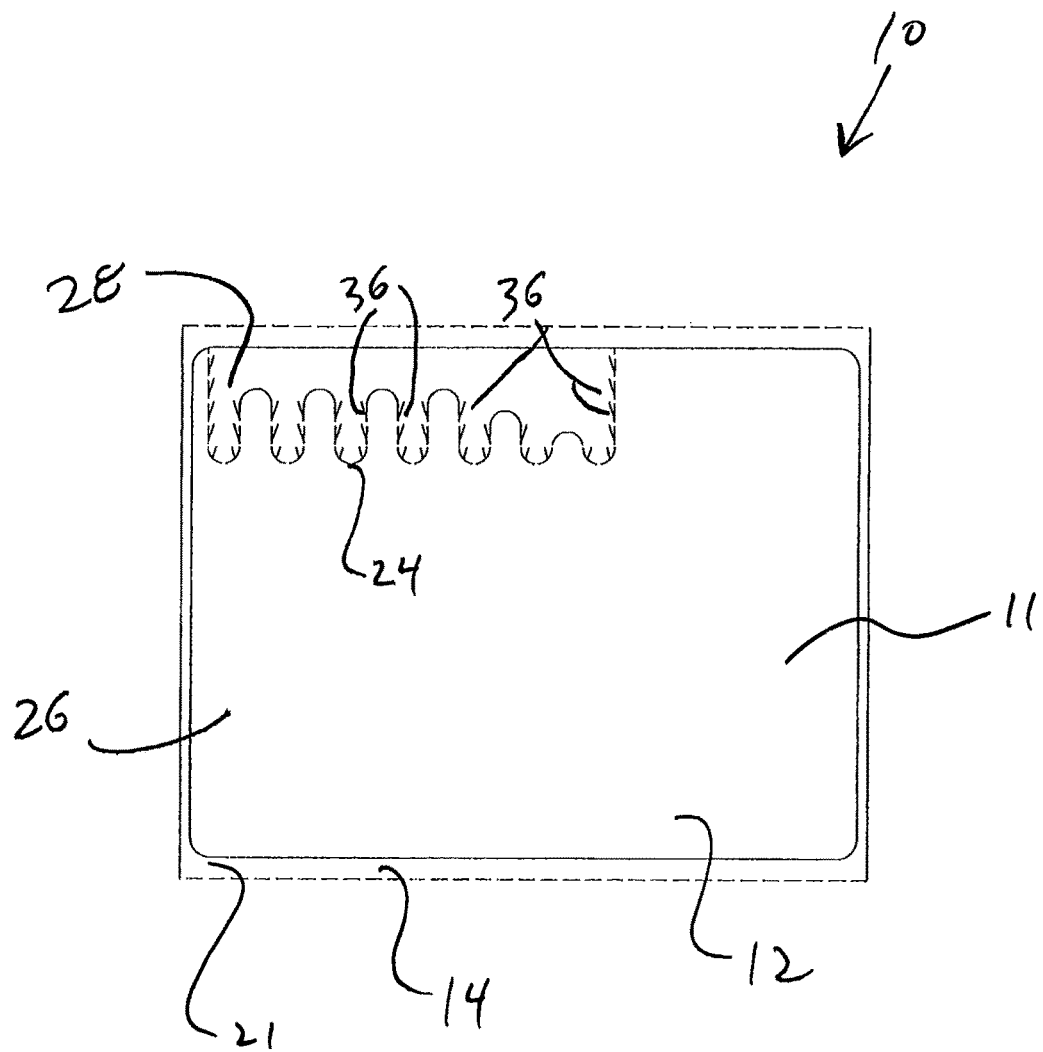
FIG. 5 shows a top view of a privacy label according to at least one embodiment of the present disclosure.
Figure 6:
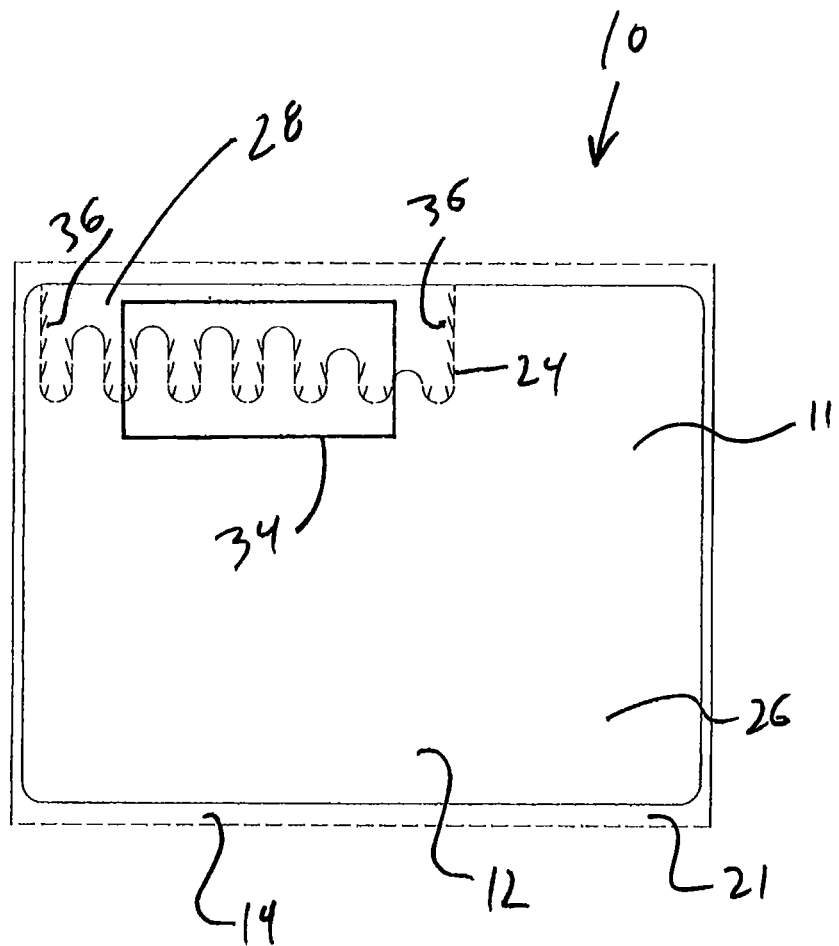
FIG. 6 shows a top view of a privacy label according to at least one embodiment of the present disclosure.

FIG. 5 shows a top view of an embodiment of privacy label 10 according to the present disclosure. As shown in FIG. 5, line of weakness 24 comprises additional lines of weakness 36 oriented at angles from line of weakness 24. These additional lines of weakness 36 are internal to second segment 28, and facilitate removal of second segment 28 as an intact piece. FIG. 6 shows a top view of privacy label 10 according to at least one embodiment of the present disclosure, where line of weakness 24 comprises lines of weakness 36 as shown on FIG. 5. Where such an embodiment of privacy label 10 is used, indicia, such as, for example, patient- specific indicia regarding a medical patient, is printed on an indicia-friendly surface of label sheet 12 in a fashion that intersects line of weakness 24 and lines of weakness 36. For example, in at least one embodiment of the present disclosure, such indicia would be printed within the area denoted by box 34 in FIG. 6. Accordingly, a portion of such indicia would appear within first segment 26, and a portion of such indicia would appear within second segment 28.

Figure 7A:
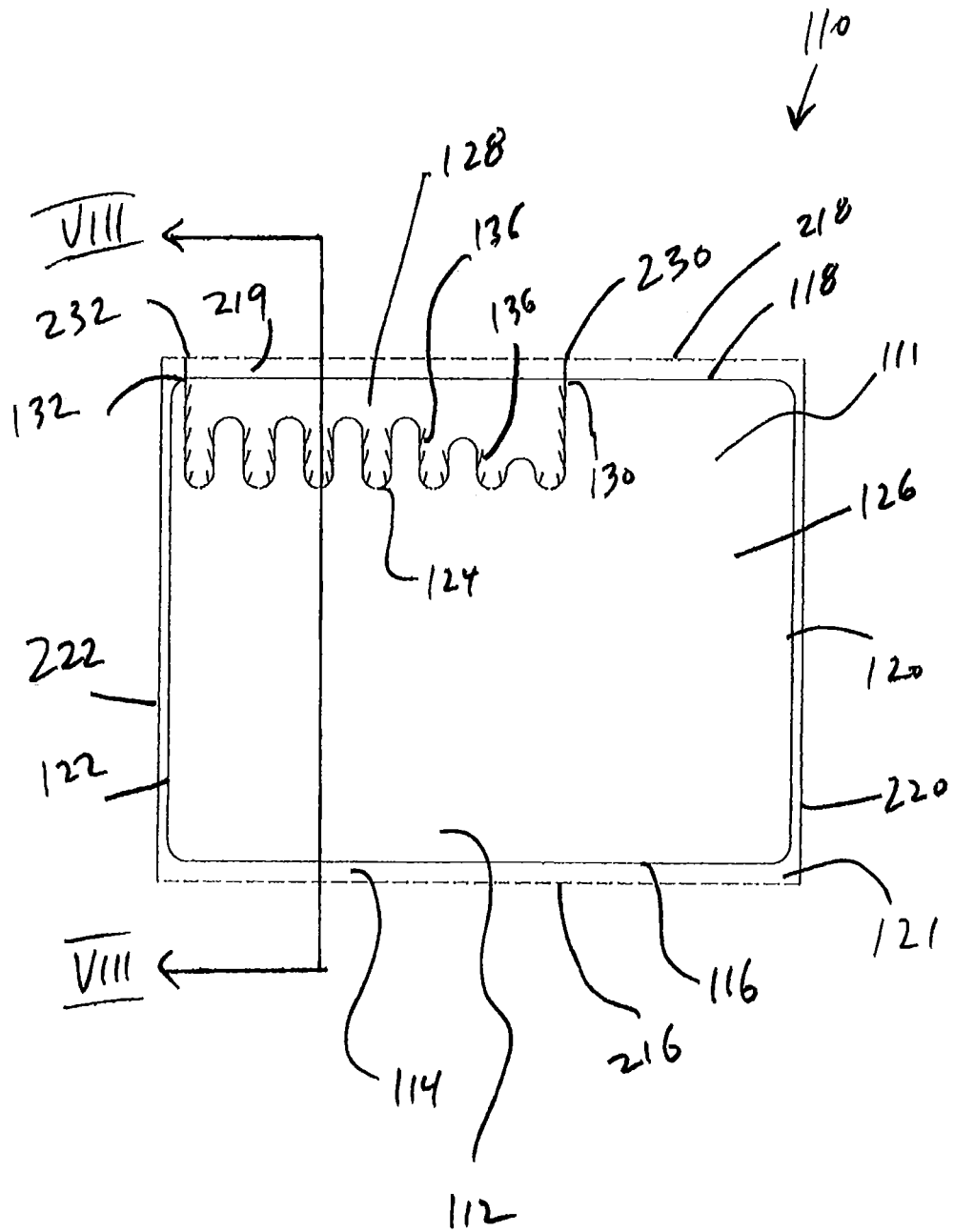
FIG. 7A shows a top view of a privacy label according to at least one embodiment of the present disclosure.
Figure 7B:
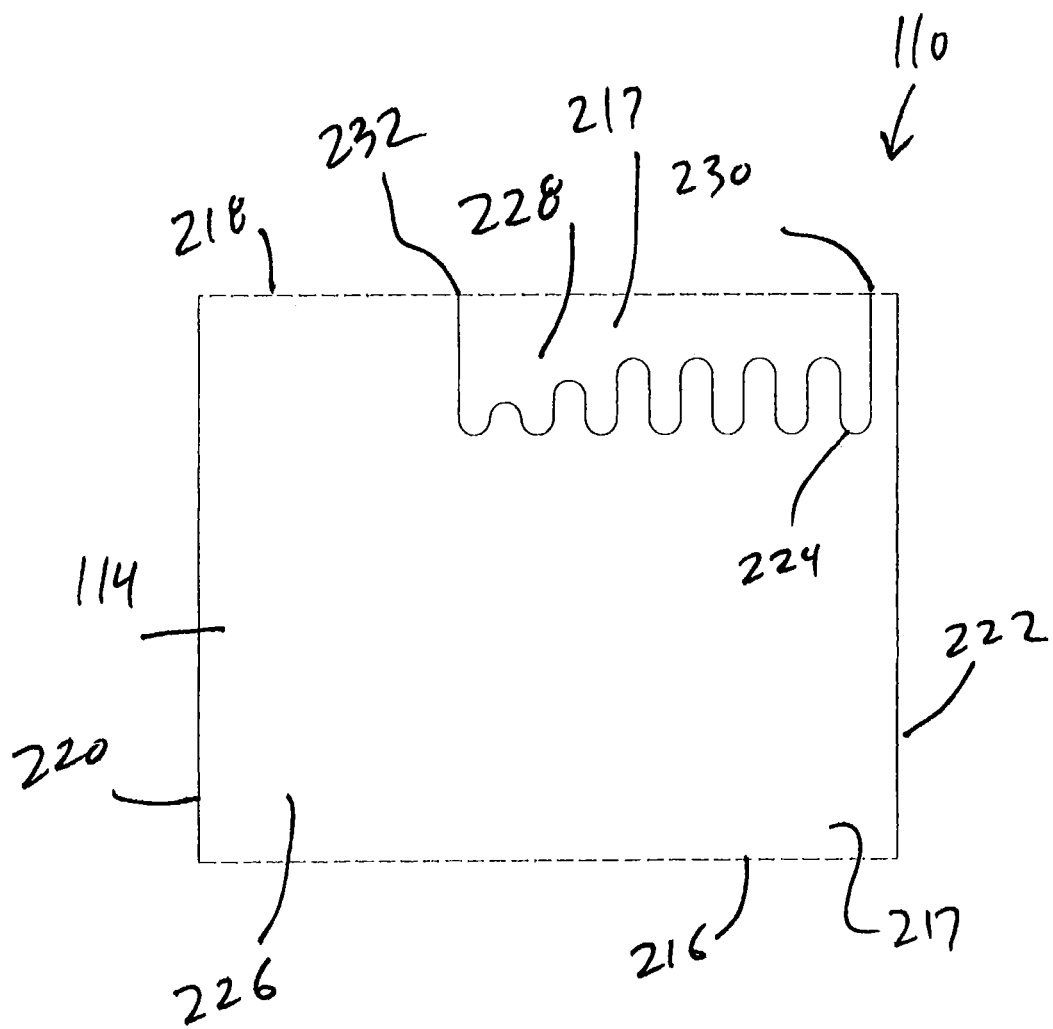
FIG. 7B shows a bottom view of a privacy label according to at least one embodiment of the present disclosure.

FIG. 7A shows a top view of privacy label 110 according to at least one embodiment of the present disclosure. FIG. 7B shows a bottom view of privacy label 110 according to at least one embodiment of the present disclosure. As shown in FIGS. 7A-B, privacy label 110 comprises label sheet 112, which is removably adhered to liner sheet 114. Label sheet 112 is bounded by bottom edge 116, top edge 118, and side edges 120, 122, and comprises a top side 111 and underside 117 (not shown in FIGS. 7A-B). Liner sheet 114 is bounded by bottom margin 216, top margin 218, and side margins 220, 222, and comprises a first surface 121 and second surface 217. In at least one embodiment of the present disclosure, label sheet 112 comprises a material suitable for the printing of indicia thereon, such as, for example, paper, polyester, or another polymer material. In at least one embodiment of the present disclosure, liner sheet 114 comprises a release coating (not shown), such as, for example, a silicone, on at least a portion of first surface 121.

In the embodiment of privacy label 110 shown in FIGS. 7A-B, line of weakness 124 extends through label sheet 112, and line of weakness 224 extends through liner sheet 114. Line of weakness 124 divides label sheet 112 into first segment 126 and second segment 128. Line of weakness 224 divides liner sheet 114 into first sector 226 underlying first segment 126 of label sheet 112, and second sector 228 underlying second segment 128 of label sheet 112. In at least one embodiment of the present disclosure, line of weakness 224 is in registration with line of weakness 124. In at least one embodiment of the present disclosure, line of weakness 224 may be offset from line of weakness 124.

In at least one embodiment of the present disclosure, lines of weakness 124, 224 have a curvilinear shape. In at least one embodiment of the present disclosure, line of weakness 224 begins at top margin 218 of liner sheet 114 (shown as intersection point 230 in FIGS. 7A-B), and also terminates at top margin 218 of liner sheet 114 (shown as intersection point 232 in FIGS. 7A-B). In at least one embodiment of the present disclosure, line of weakness 124 intersects with top edge 118 of label sheet 112 (shown as intersection points 130, 132 in FIG. 7A). In at least one embodiment of the present disclosure, line of weakness 124 comprises a series of perforations. In at least one embodiment of the present disclosure, line of weakness 124 comprises a die cut. In at least one embodiment of the present disclosure, line of weakness 124 comprises additional lines of weakness 136 oriented at angles from line of weakness 124. In at least one embodiment of the present disclosure, line of weakness 224 comprises a series of perforations. In at least one embodiment of the present disclosure, line of weakness 224 comprises a die cut.

In at least one embodiment of the present disclosure, line of weakness 124 comprises a series of perforations in label sheet 112, and line of weakness 224 comprises a die cut in liner sheet 114. In such an embodiment, the series of perforations in label sheet 112 facilitates retention of segment 128 as part of label sheet 112 until segment 128 is removed from label sheet 112 as discussed elsewhere herein. The die cut line of weakness 224 in liner sheet 114 facilitates retention of second sector 228 of liner sheet 114 with second segment 128 of label sheet 112 when second sector 228 of liner sheet 114 is separated from first sector 226 of liner sheet 114 as discussed elsewhere herein. Second sector 228 of liner sheet 114 serves to reinforce second segment 128 when it is removed from label sheet 112. Tab 219 is the portion of liner sheet 114 between intersection points 230, 232 that it visible beyond top edge 118 of label sheet 112. Tab 219 serves as an aid in removing second segment 128 from label sheet 112.

FIG. 8 shows a cross-sectional view of at least one embodiment of privacy label 110, taken along line VIII-VIII of FIG. 7A. In the embodiment of privacy label 110 shown in FIG. 8, line of weakness 124 extends through label sheet 112, and line of weakness 224 extends through liner sheet 114. Also as shown in FIG. 8, adhesive 113 is interposed between label sheet 112 and liner sheet 114 in the area underlying first segment 126. As shown in FIG. 8, adhesive 115 is interposed between label sheet 112 and liner sheet 114 in the area of second sector 428 underlying second sector 228. Adhesive 113 is permanently adhered to underside 117 of label sheet 112 in the area underlying first segment 126. However, the release coating (not shown) on liner sheet 114 permits removal of label sheet 112 and adhesive 113 from liner sheet 114. Adhesive 115 also is permanently adhered to label sheet 112 in the area of second sector 228 underlying second segment 128. In this embodiment of privacy label 110, adhesive 115 also is permanently adhered to liner sheet 114 in the area of second sector 228 underlying second segment 128. Accordingly, in the area of second sector 228 underlying second segment 128, label sheet 112 cannot be readily detached from liner sheet 114. In at least one embodiment, permanent adherence of label sheet 112 to liner sheet 114 in the area of second sector 228 underlying second segment 128 is accomplished through the use of an adhesive 115 in this region that overcomes the release coating on liner sheet 114 and bonds label sheet 112 to liner sheet 114 in the area of second sector 228 underlying second segment 128. In at least one embodiment, permanent adherence of label sheet 112 to liner sheet 114 in the area of second sector 228 underlying second segment 128 is accomplished through the removal of the release coating on liner sheet 114 in the area of second sector 228 underlying second segment 128, so that adhesive 115 adheres to the substrate of liner sheet 114, thereby bonding label sheet 112 to liner sheet 114 in the area of second sector 228 underlying second segment 128. In at least one such embodiment, adhesive 113 may be the same adhesive as adhesive 115.

Figure 9:
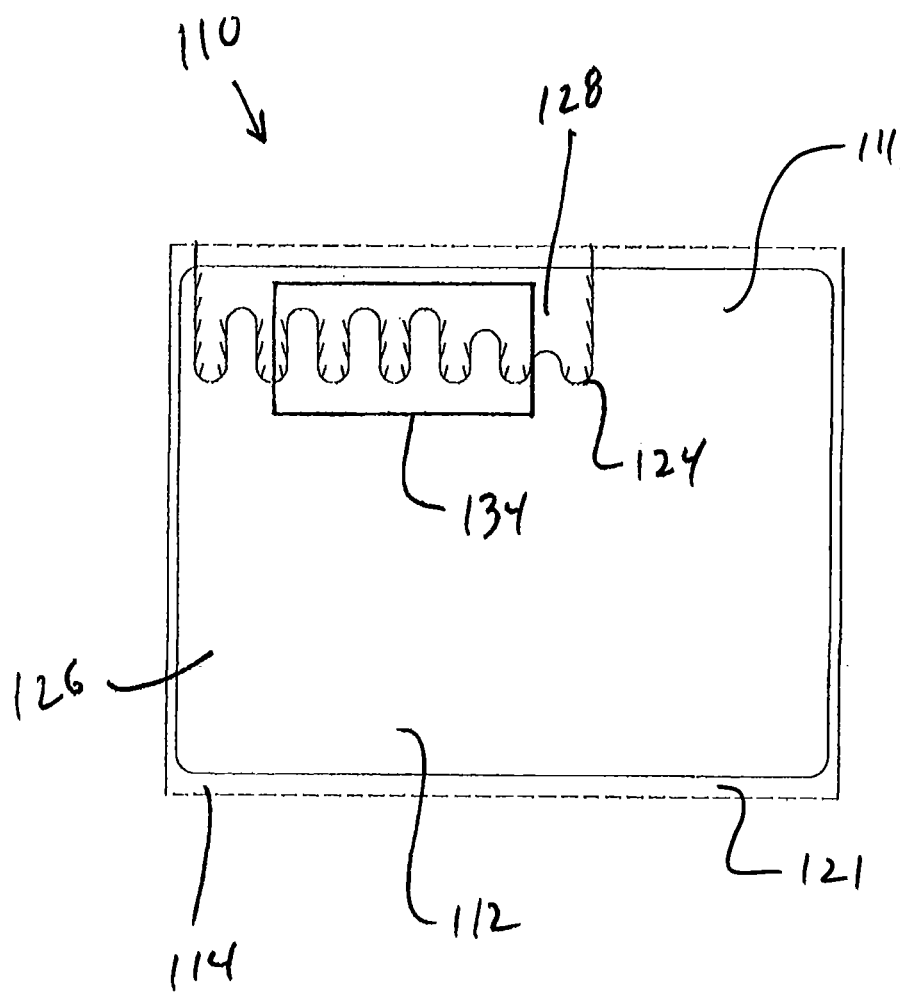
FIG. 9 shows a top view of a privacy label according to at least one embodiment of the present disclosure.

FIG. 9 shows a top view of privacy label 110 according to at least one embodiment of the present disclosure. Where such an embodiment of privacy label 110 is used, indicia, such as, for example, patient-specific indicia regarding a medical patient, is printed on an indicia-friendly surface of label sheet 112 in a fashion that intersects line of weakness 124. For example, in at least one embodiment of the present disclosure, such indicia would be printed within the area denoted by box 134 in FIG. 9. Accordingly, a portion of such indicia would appear within first segment 126, and a portion of such indicia would appear within second segment 128.

Figure 10:
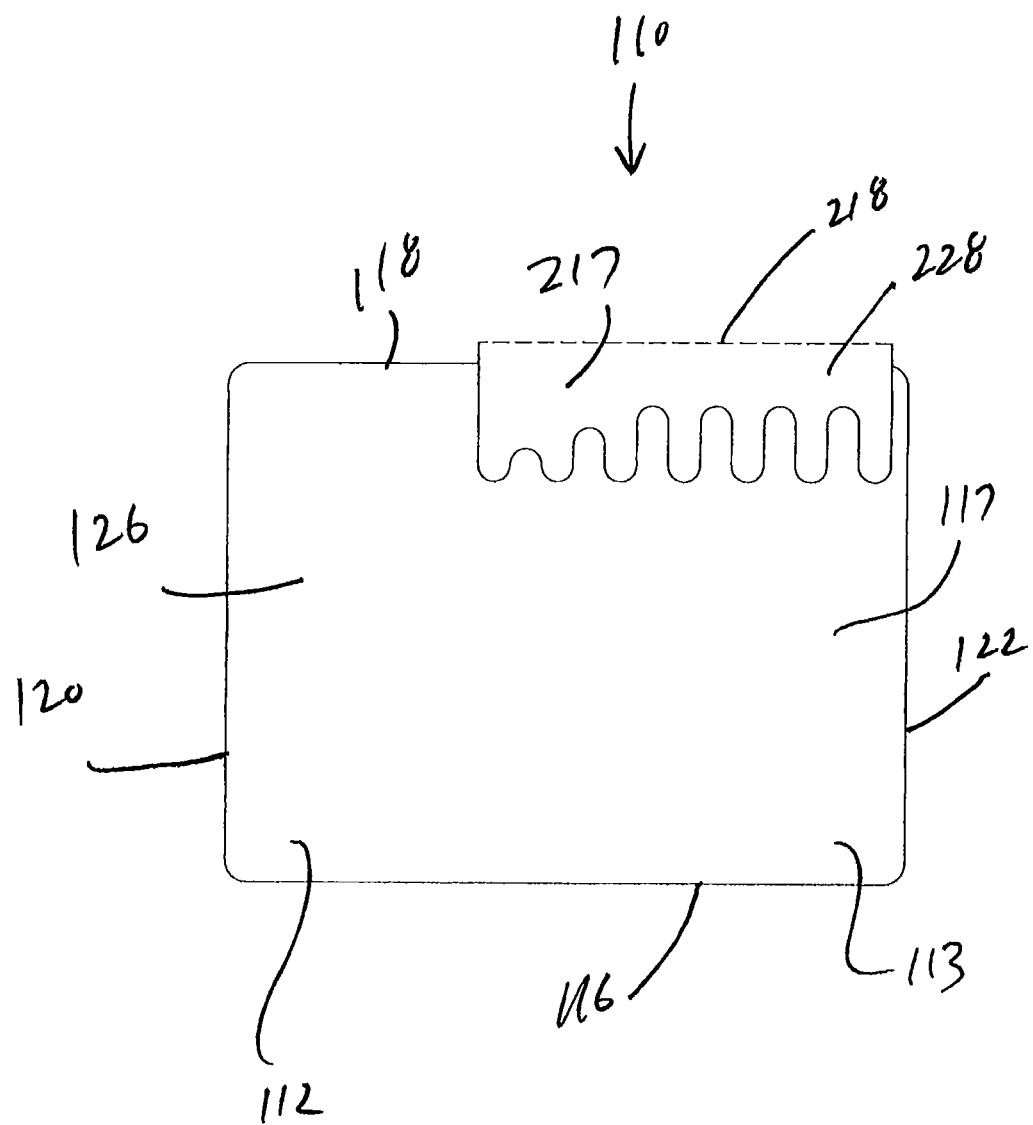
FIG. 10 shows a bottom view of a privacy label according to at least one embodiment of the present disclosure.

FIG. 10 shows a bottom view of privacy label 110 according to at least one embodiment of the present disclosure, after label sheet 112 is removed from liner sheet 114. Underside 117 of label sheet 112 comprising adhesive 113 is shown in FIG. 10. Also visible in FIG. 10 is second sector 228 of liner sheet 114, which remains adhered to label sheet 112 after label sheet 112 is removed from liner sheet 114.

According to the present disclosure, label sheet 112 with indicia thereon may be removed from liner sheet 114 and adhered to a surface of an object such as a medical chart, medical device, medication container, and the like. Because line of weakness 124 extends through label sheet 112 and line of weakness 224 extends through liner sheet 114, and because adhesive 115 bonds label sheet 112 to liner sheet 114 in the area of second sector 228 underlying second segment 128, when label sheet 112 with indicia thereon is removed from liner sheet 114, second sector 228 underlying second segment 128 separates from the rest of liner sheet 114 and remains attached to label sheet 112. First sector 226 of liner sheet 114 may be discarded. Adhesive 113 underlying first segment 126 then may be adhered to the desired surface, such as a medical chart, medical device, medication container, and the like, but because second surface 217 of second sector 228 is free of or substantially free of adhesive, second sector 228 of liner sheet 114 and second segment 128 of label sheet 112 are not adhered to the surface.

When the object is to be disposed of, because second segment 128 is not adhered to the surface, second segment 128 may be readily separated from first segment 126 at line of weakness 124 and removed. Second segment 128 then may be disposed of in a fashion that complies with the relevant laws concerning privacy of medical information.

Separating second segment 128 from first segment 126 at line of weakness 124 destroys the coherence of the indicia on label sheet 112, as the portion of such indicia appearing within second segment 128 no longer is present. After second segment 128 is removed, first segment 126 remains adhered to the surface of the object, but the portion of the indicia appearing within first segment 126 is made unintelligible though the removal of second segment 128. The object, including first segment 126, also may then be disposed of in a fashion that complies with the relevant laws concerning privacy of medical information.

Figure 11:
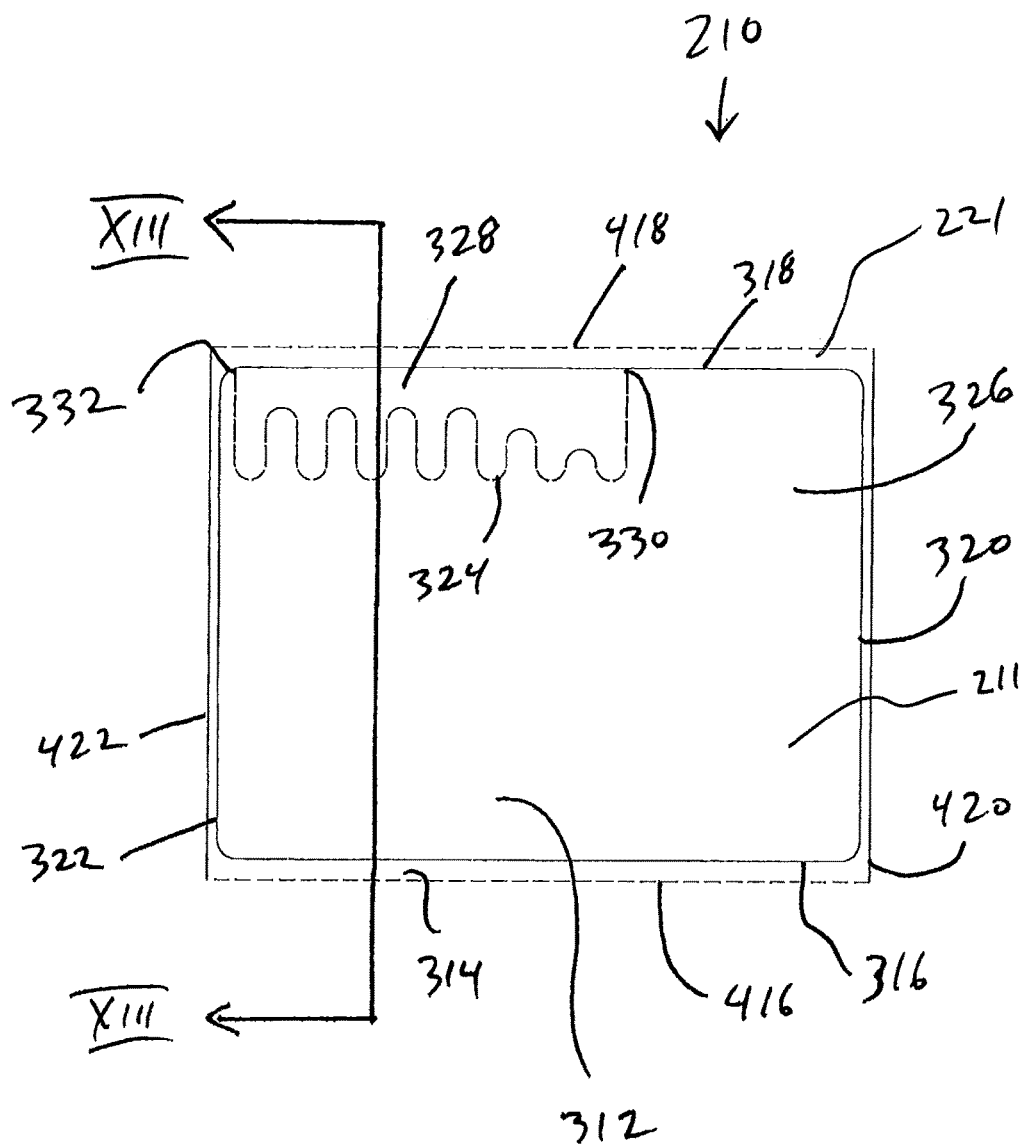
FIG. 11 shows a top view of a privacy label according to at least one embodiment of the present disclosure.
Figure 12:
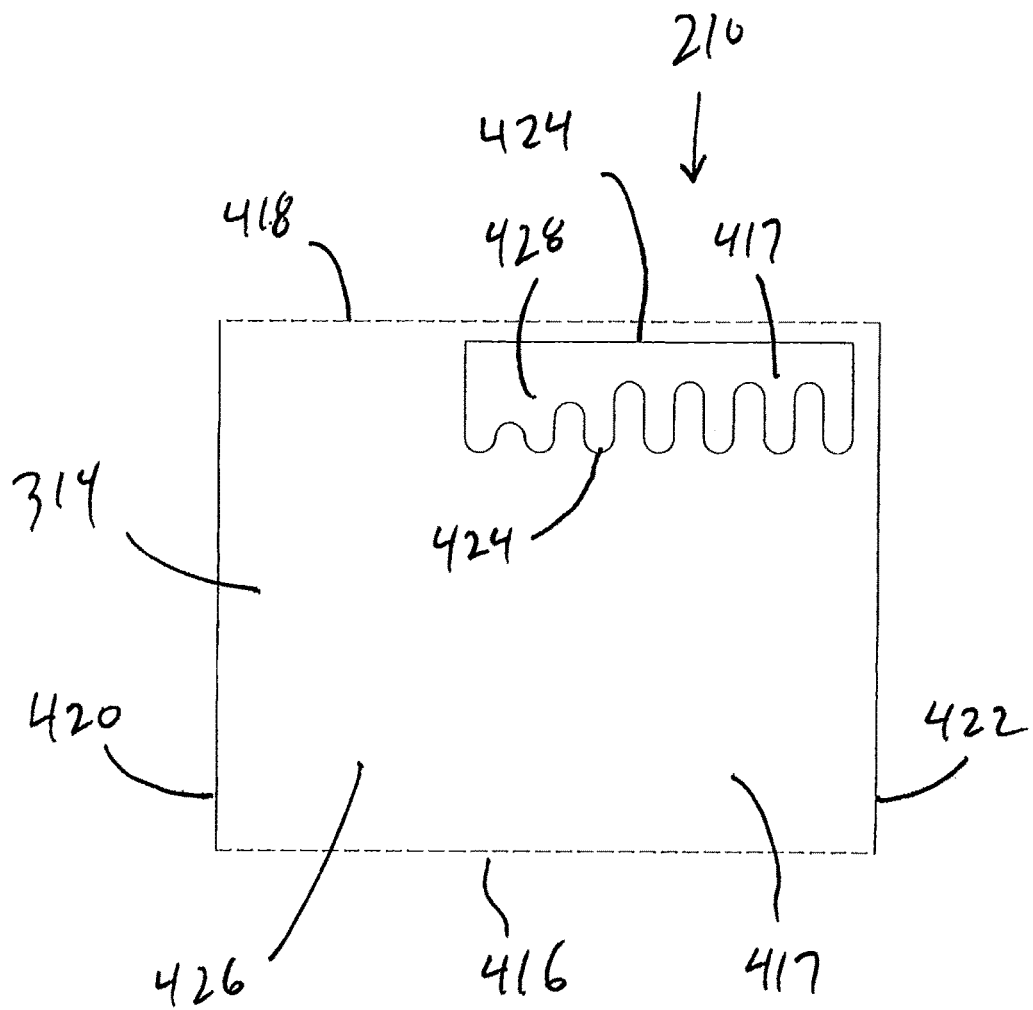
FIG. 12 shows a bottom view of a privacy label according to at least one embodiment of the present disclosure.

FIG. 11 shows a top view of privacy label 210 according to at least one embodiment of the present disclosure. FIG. 12 shows a bottom view of privacy label 210 according to at least one embodiment of the present disclosure. As shown in FIGS. 11-12, privacy label 210 comprises label sheet 312, which is removably adhered to liner sheet 314. Label sheet 312 is bounded by bottom edge 316, top edge 318, and side edges 320, 322, and comprises a top side 211 and an underside 317 (not shown in FIGS. 11-12). Liner sheet 314 is bounded by bottom margin 416, top margin 418, and side margins 420, 422, and comprises a first surface 221 and second surface 417. In at least one embodiment of the present disclosure, label sheet 312 comprises a material suitable for the printing of indicia thereon, such as, for example, paper, polyester, or another polymer material. In at least one embodiment of the present disclosure, liner sheet 314 comprises a release coating (not shown), such as, for example, a silicone, on at least a portion of the surface facing label sheet 312.

In the embodiment of privacy label 210 shown in FIGS. 11-12, line of weakness 324 extends through label sheet 312, and line of weakness 424 extends through liner sheet 314. Line of weakness 324 divides label sheet 312 into first segment 326 and second segment 328. Line of weakness 324 divides liner sheet 314 into first sector 426 underlying first segment 326 of label sheet 312, and second sector 428 underlying second segment 328 of label sheet 312. In at least one embodiment of the present disclosure, line of weakness 424 is in registration with line of weakness 324. In at least one embodiment of the present disclosure, line of weakness 424 may be offset from line of weakness 324.

In at least one embodiment of the present disclosure, lines of weakness 324, 424 have a curvilinear shape. In at least one embodiment of the present disclosure, line of weakness 424 is completely inboard of bottom margin 416, top margin 418, and side margins 420, 422 of liner sheet 314. In at least one embodiment of the present disclosure, line of weakness 324 intersects with top edge 318 of label sheet 312 (shown as intersection points 330, 332 in FIG. 11). In at least one embodiment of the present disclosure, line of weakness 324 comprises a series of perforations. In at least one embodiment of the present disclosure, line of weakness 324 comprises a die cut. In at least one embodiment of the present disclosure, line of weakness 324 comprises oriented at angles from line of weakness 324, similar to lines of weakness 36, 136 shown elsewhere herein. In at least one embodiment of the present disclosure, line of weakness 424 comprises a series of perforations. In at least one embodiment of the present disclosure, line of weakness 424 comprises a die cut.

In at least one embodiment of the present disclosure, line of weakness 324 comprises a series of perforations in label sheet 312, and line of weakness 424 comprises a die cut in liner sheet 314. In such an embodiment, the series of perforations in label sheet 312 facilitates retention of segment 328 as part of label sheet 312 until segment 328 is removed from label sheet 312 as discussed elsewhere herein. The die cut line of weakness 424 in liner sheet 314 facilitates retention of second sector 428 of liner sheet 314 with second segment 328 of label sheet 312 when second sector 428 of liner sheet 314 is separated from first sector 426 of liner sheet 314 as discussed elsewhere herein. Second sector 428 of liner sheet 314 serves to reinforce second segment 328 when it is removed from label sheet 312.

Figure 13:
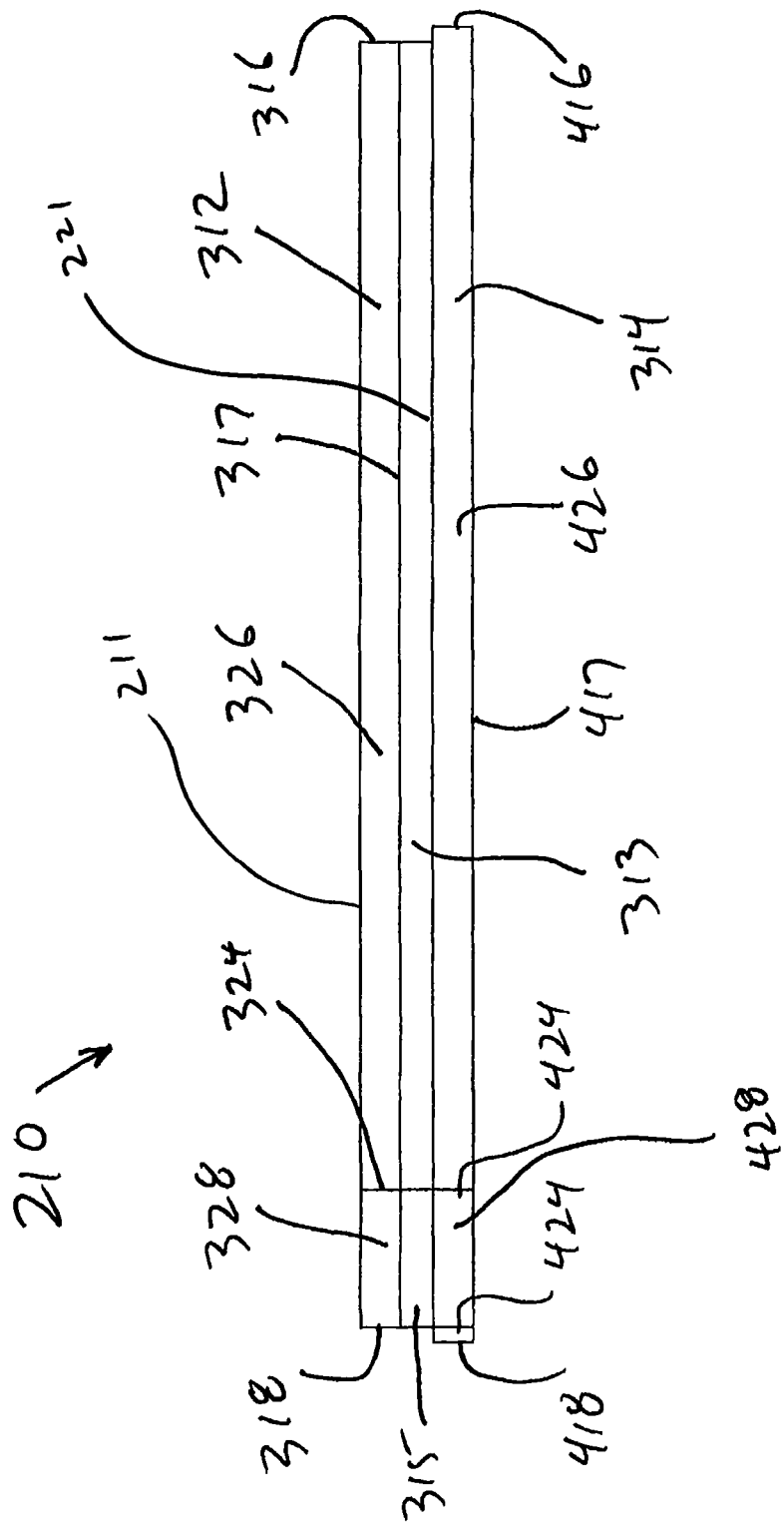
FIG. 13 shows a cross-sectional view of a privacy label according to at least one embodiment of the present disclosure.

FIG. 13 shows a cross-sectional view of at least one embodiment of privacy label 210, taken along line XIII-XIII of FIG. 11. In the embodiment of privacy label 210 shown in FIG. 13, line of weakness 324 extends through label sheet 312, and line of weakness 424 extends through liner sheet 314. Also as shown in FIG. 13, adhesive 313 is interposed between label sheet 312 and liner sheet 314 in the area underlying first segment 326. As shown in FIG. 13, adhesive 315 is interposed between label sheet 312 and liner sheet 314 in the area of second sector 428 underlying second segment 328. Adhesive 313 is permanently adhered to underside 317 of label sheet 312 in the area underlying first segment 326. However, the release coating (not shown) on liner sheet 314 permits removal of label sheet 312 and adhesive 313 from liner sheet 314. Adhesive 315 also is permanently adhered to label sheet 312 in the area of second sector 428 underlying second segment 328. In this embodiment of privacy label 210, adhesive 315 also is permanently adhered to liner sheet 314 in the area of second sector 428 underlying second segment 328. Accordingly, in the area of second sector 428 underlying second segment 328, label sheet 312 cannot be readily detached from liner sheet 314. In at least one embodiment, permanent adherence of label sheet 312 to liner sheet 314 in the area of second sector 428 underlying second segment 328 is accomplished through the use of an adhesive 315 in this region that overcomes the release coating on liner sheet 314 and bonds label sheet 312 to liner sheet 314 in the area of second sector 428 underlying second segment 328. In at least one embodiment, permanent adherence of label sheet 312 to liner sheet 314 in the area of second sector 428 underlying second segment 328 is accomplished through the removal of the release coating on liner sheet 314 in the area of second sector 428 underlying second segment 328, so that adhesive 315 adheres to the substrate of liner sheet 314, thereby bonding label sheet 312 to liner sheet 314 in the area of second sector 428 underlying second segment 328. In at least one such embodiment, adhesive 313 may be the same adhesive as adhesive 315.

Figure 14:
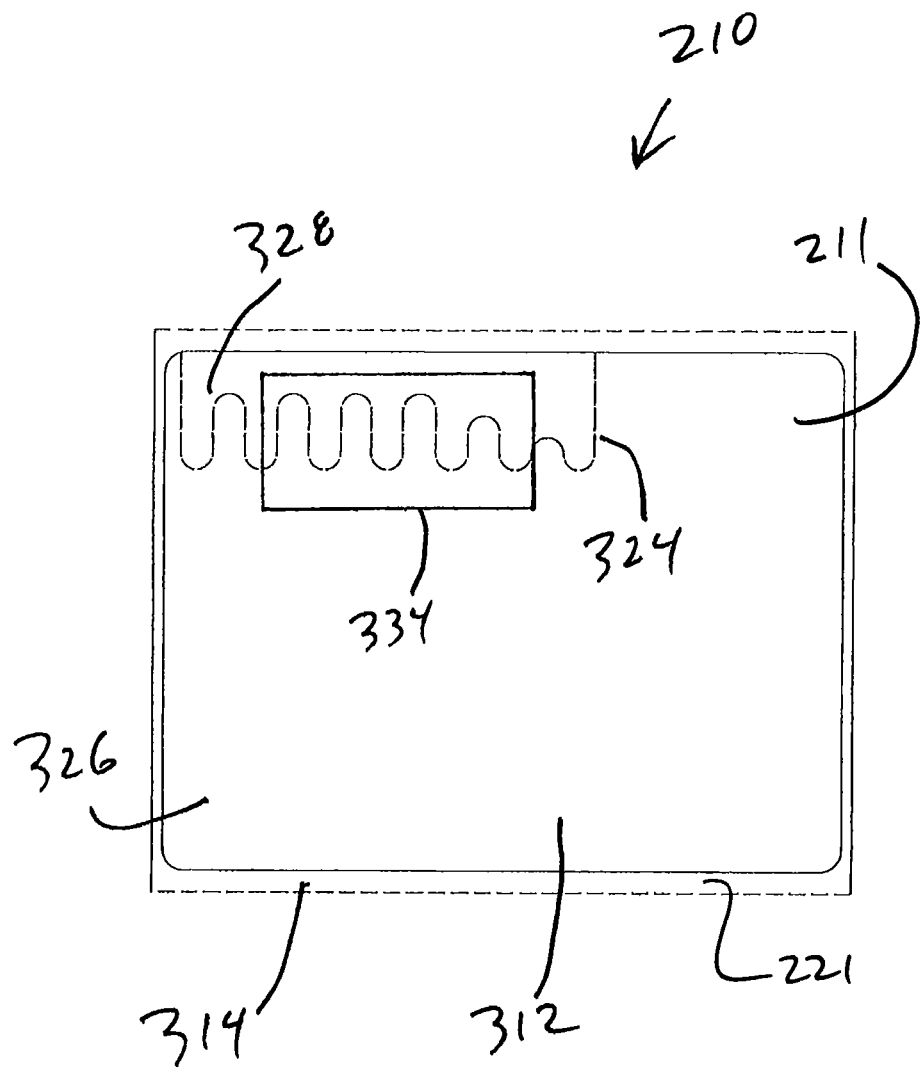
FIG. 14 shows a top view of a privacy label according to at least one embodiment of the present disclosure.

FIG. 14 shows a top view of privacy label 210 according to at least one embodiment of the present disclosure. Where such an embodiment of privacy label 210 is used, indicia, such as, for example, patient-specific indicia regarding a medical patient, is printed on an indicia-friendly surface of label sheet 312 in a fashion that intersects line of weakness 324. For example, in at least one embodiment of the present disclosure, such indicia would be printed within the area denoted by box 334 in FIG. 14. Accordingly, a portion of such indicia would appear within first segment 326, and a portion of such indicia would appear within second segment 328.

Figure 15:
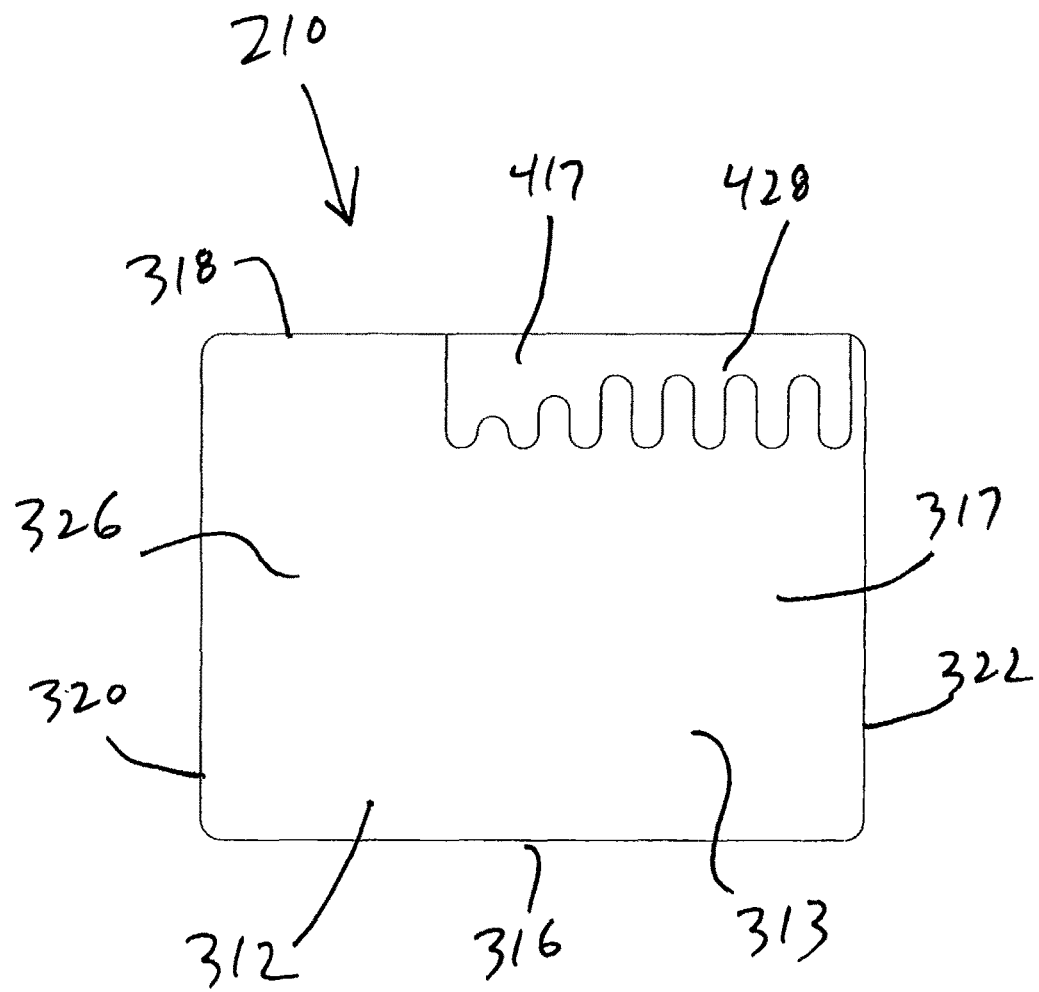
FIG. 15 shows a bottom view of a privacy label according to at least one embodiment of the present disclosure.

FIG. 15 shows a bottom view of privacy label 210 according to at least one embodiment of the present disclosure, after label sheet 312 is removed from liner sheet 314. Underside 317 of label sheet 312 comprising adhesive 313 is shown in FIG. 15. Also visible in FIG. 15 is second sector 428 of liner sheet 314, which remains adhered to label sheet 312 after label sheet 312 is removed from liner sheet 314.

According to the present disclosure, label sheet 312 with indicia thereon may be removed from liner sheet 314 and adhered to a surface of an object such as a medical chart, medical device, medication container, and the like. Because line of weakness 324 extends through label sheet 312 and line of weakness 424 extends through liner sheet 314, and because adhesive 315 bonds label sheet 312 to liner sheet 314 in the area of second sector 428 underlying second segment 328, when label sheet 312 with indicia thereon is removed from liner sheet 314, second sector 428 underlying second segment 328 separates from the rest of liner sheet 314 and remains attached to label sheet 312. First sector 426 of liner sheet 314 may be discarded. Adhesive 313 underlying first segment 326 then may be adhered to the desired surface, such as a medical chart, medical device, medication container, and the like, but because second surface 417 of second sector 428 is free of or substantially free of adhesive, second sector 428 of liner sheet 314 and second segment 328 of label sheet 312 are not adhered to the surface.

When the object is to be disposed of, because second segment 328 is not adhered to the surface, second segment 328 may be readily separated from first segment 326 at line of weakness 324 and removed. Second segment 328 then may be disposed of in a fashion that complies with the relevant laws concerning privacy of medical information. Separating second segment 328 from first segment 326 at line of weakness 324 destroys the coherence of the indicia on label sheet 312, as the portion of such indicia appearing within second segment 328 no longer is present. After second segment 328 is removed, first segment 326 remains adhered to the surface of the object, but the portion of the indicia appearing within first segment 326 is made unintelligible though the removal of second segment 328. The object, including first segment 326, also may then be disposed of in a fashion that complies with the relevant laws concerning privacy of medical information.

Figure 16:
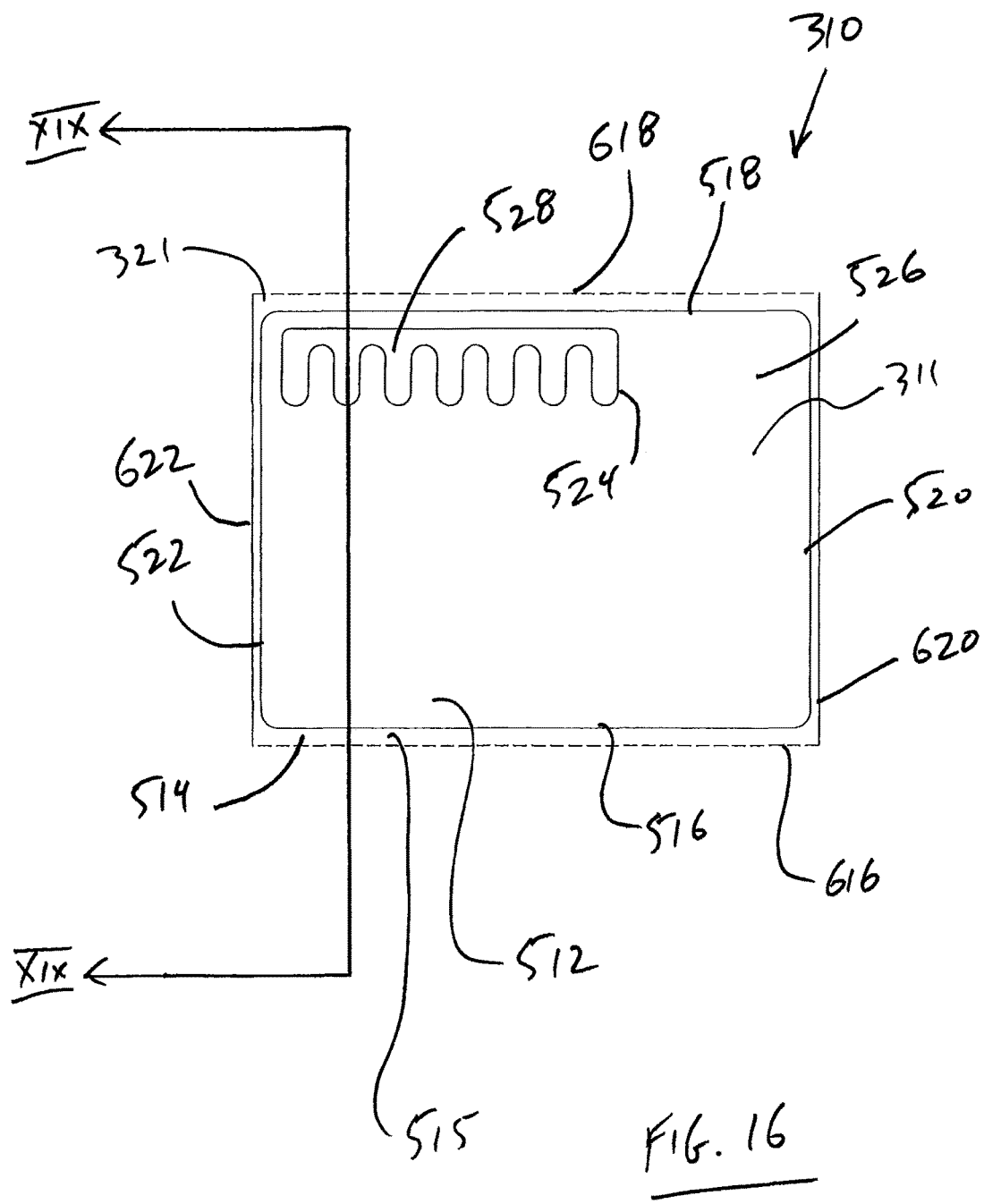
FIG. 16 shows a top view of a privacy label according to at least one embodiment of the present disclosure.

FIG. 16 shows a top view of privacy label 310 according to at least one embodiment of the present disclosure. As shown in FIG. 16, privacy label 310 comprises label sheet 512, which is removably adhered to liner sheet 514. Label sheet 512 is bounded by bottom edge 516, top edge 518, and side edges 520, 522, and comprises a top side 311 and an underside 517 (not shown in FIG. 16). Liner sheet 514 is bounded by bottom margin 616, top margin 618, and side margins 620, 622, and comprises a first surface 321 and second surface 617. In at least one embodiment of the present disclosure, label sheet 512 comprises a material suitable for the printing of indicia thereon, such as, for example, paper, polyester, or another polymer material. In at least one embodiment of the present disclosure, liner sheet 514 comprises a release coating 515, such as, for example, a silicone, on at least a portion of first surface 321.

In the embodiment of privacy label 310 shown in FIG. 16, line of weakness 524 extends through label sheet 512, but not through liner sheet 514. Line of weakness 524 divides label sheet 512 into first segment 526 and second segment 528. In at least one embodiment of the present disclosure, lines of weakness 524 has a curvilinear shape. In at least one embodiment of the present disclosure, line of weakness 524 is completely inboard of bottom edge 516, top edge 518, and side edges 520, 522 of liner sheet 514. In at least one embodiment of the present disclosure, line of weakness 524 comprises a series of perforations. In at least one embodiment of the present disclosure, line of weakness 524 comprises a die cut. In at least one embodiment of the present disclosure, line of weakness 524 comprises additional lines of weakness (not shown in FIG. 16) that are oriented at angles from line of weakness 524, similar to lines of weakness 36, 136 shown elsewhere herein.

Figure 19:
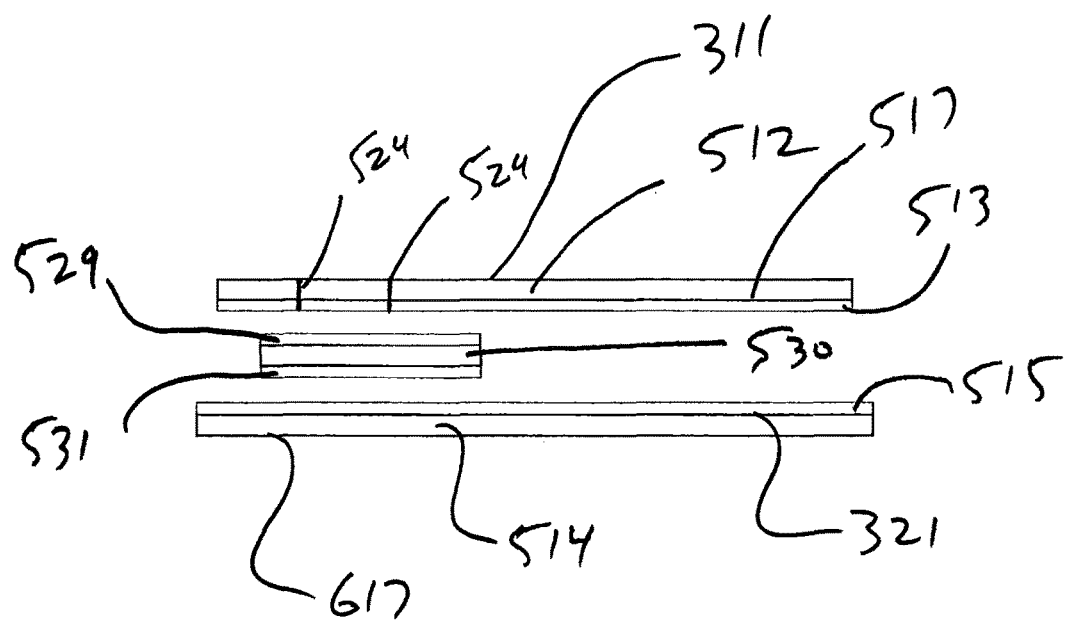
FIG. 19 shows an exploded cross-sectional view of a privacy label according to at least one embodiment of the present disclosure.

Privacy label 310 according to at least one embodiment of the present disclosure further comprises a patch of material between label sheet 512 and liner sheet 514. FIG. 19 shows an exploded cross-sectional view of at least one embodiment of privacy label 310, taken along line XIX-XIX of FIG. 16, with proportions enhanced for purposes of clarity. In the embodiment of privacy label 310 shown in FIG. 19, intermediate sheet 530 is between label sheet 512 and liner sheet 514, underlying first segment 526.

As shown in FIG. 19, underside 517 of label sheet 512 comprises adhesive 513. As shown in FIG. 19, intermediate sheet 530 comprises a release coating 529, such as, for example, a silicone, on at least a portion of upper surface facing label sheet 512. The interaction of adhesive 513 and release coating 529 removably adheres label sheet 512 to intermediate sheet 530. As shown in FIG. 19, intermediate sheet 530 further comprises adhesive 531 on at least a portion of the lower surface facing liner sheet 514. The interaction of release coating 515 and adhesive 531 removably adheres liner sheet 514 to intermediate sheet 530. The interaction of adhesive 513 and release coating 515 in the area where intermediate sheet 530 is not present removably adheres label sheet 512 to liner sheet 514 in that area. In at least one embodiment of privacy label 310 according to the present disclosure, adhesive 513, adhesive 531, release coating 515, and release coating 529 are chosen so that the releasable bond between adhesive 513 and release coating 529 is stronger than the releasable bond between release coating 515 and adhesive 531, thereby adhering intermediate sheet 530 to label sheet 512 more strongly than intermediate sheet 530 is adhered to liner sheet 514.

Figure 17:
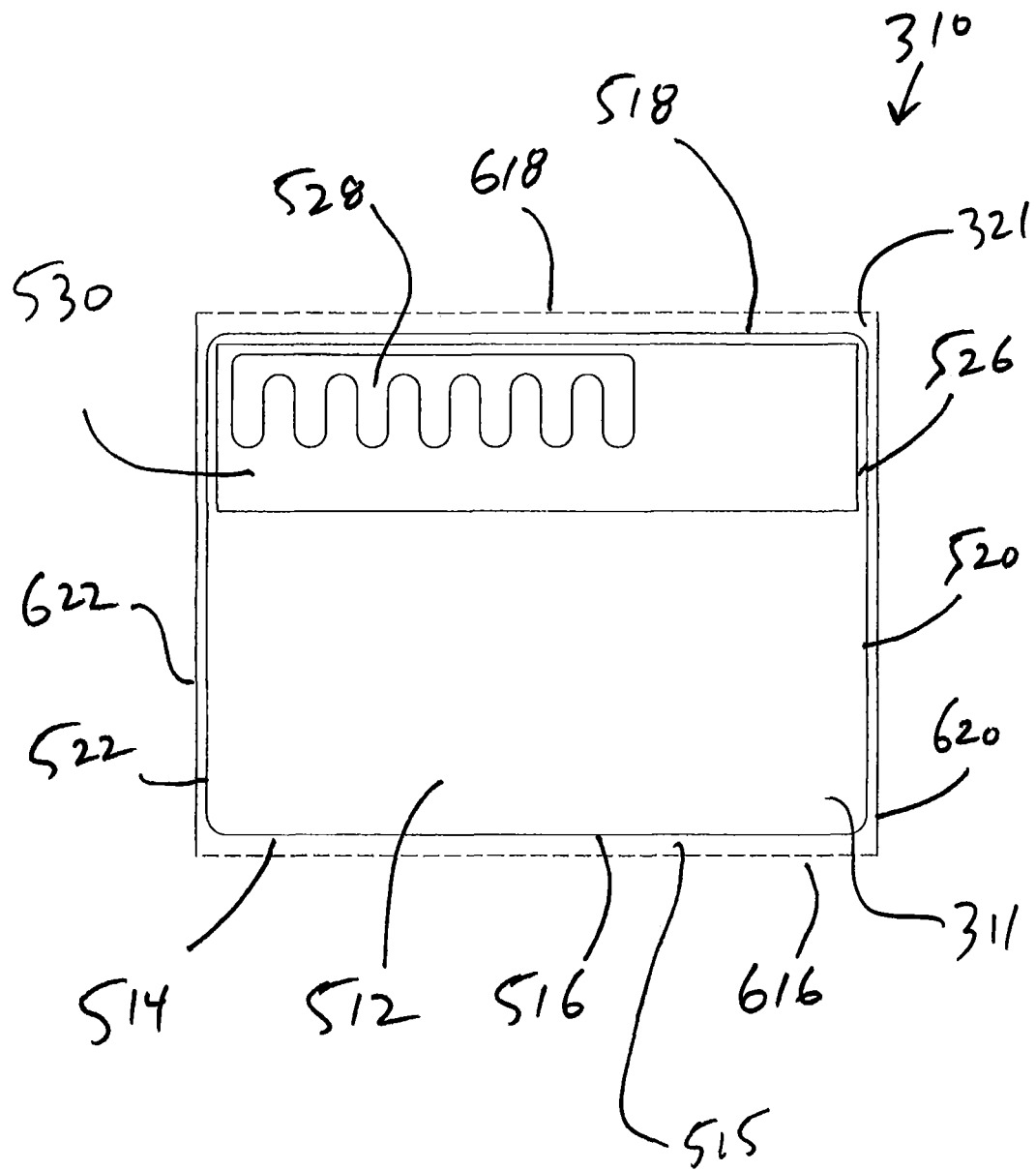
FIG. 17 shows a top view of a privacy label according to at least one embodiment of the present disclosure.
Figure 18:
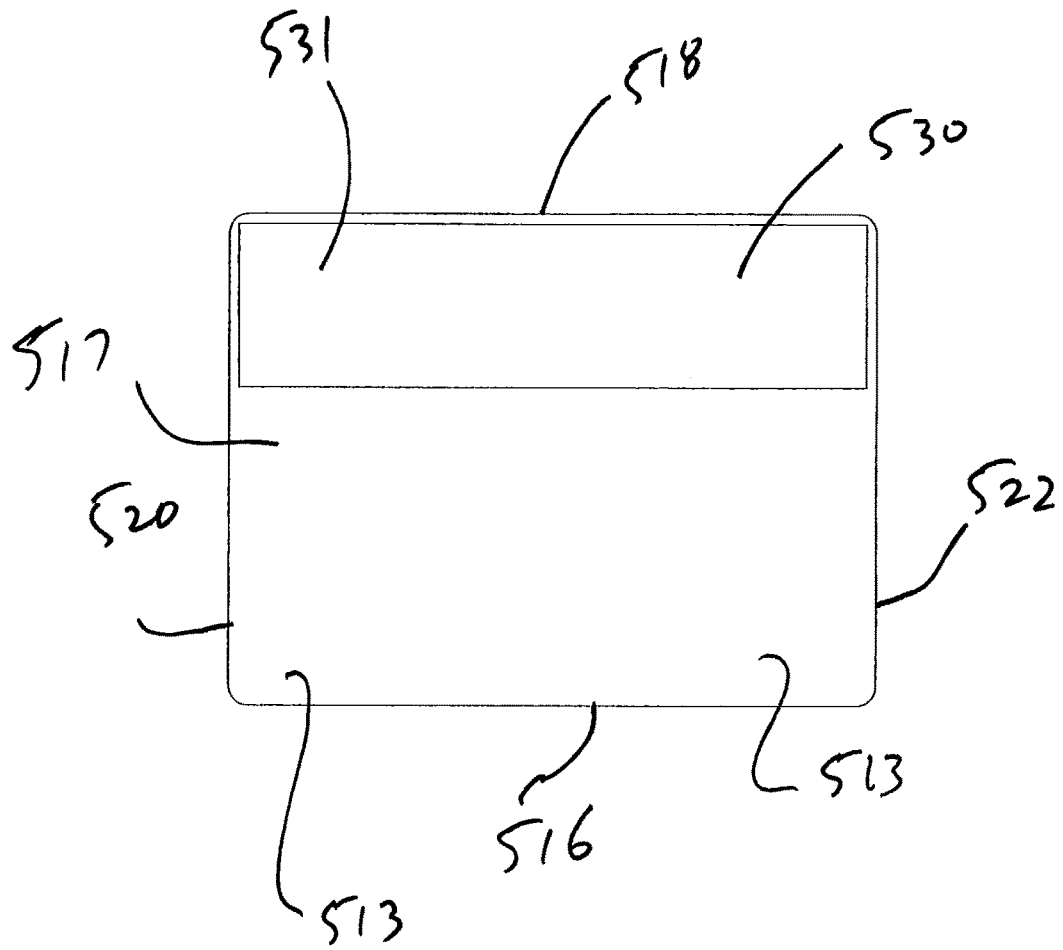
FIG. 18 shows a bottom view of a privacy label according to at least one embodiment of the present disclosure.

FIG. 17 shows a top view of privacy label 310, with the location of intermediate sheet 530 according to at least one embodiment of the present disclosure shown in phantom. FIG. 18 shows an underside view of label sheet 512 of privacy label 310 after label sheet 512 is removed from liner sheet 514. As discussed above, because the releasable bond between adhesive 513 and release coating 529 is stronger than the releasable bond between release coating 515 and adhesive 531, when label sheet 512 removed from liner sheet 514, intermediate sheet 530 remains removably adhered to underside 517 of label sheet 512 as shown in FIG. 18.

Figure 20:
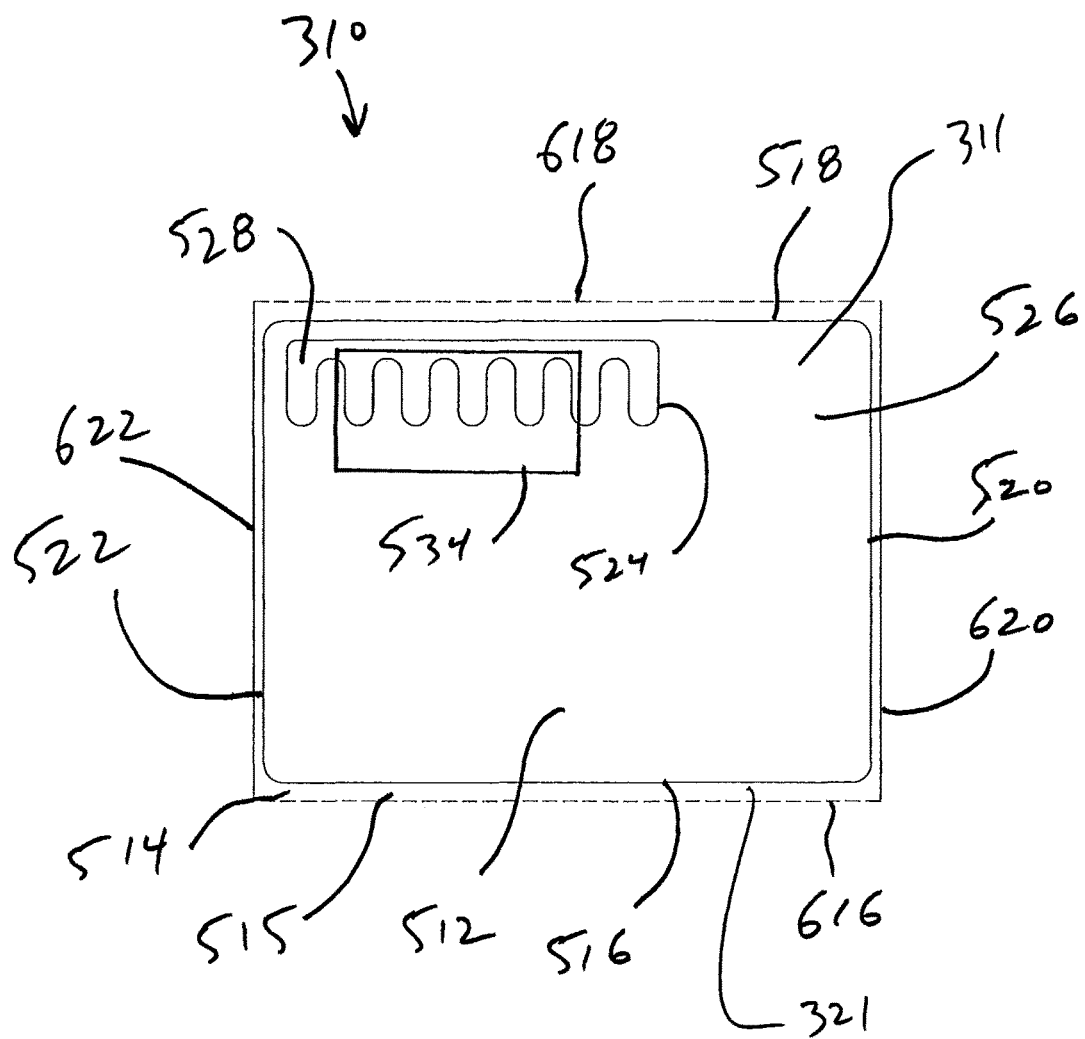
FIG. 20 shows a top view of a privacy label according to at least one embodiment of the present disclosure.

FIG. 20 shows a top view of privacy label 310 according to at least one embodiment of the present disclosure. Where such an embodiment of privacy label 310 is used, indicia, such as, for example, patient-specific indicia regarding a medical patient, is printed on an indicia-friendly surface of label sheet 512 in a fashion that intersects line of weakness 524. For example, in at least one embodiment of the present disclosure, such indicia would be printed within the area denoted by box 534 in FIG. 20. Accordingly, a portion of such indicia would appear within first segment 526, and a portion of such indicia would appear within second segment 528.

According to the present disclosure, label sheet 512 with indicia thereon may be removed from liner sheet 514 and adhered to a surface of an object such as a medical chart, medical device, medication container, and the like. When label sheet 512 removed from liner sheet 514, intermediate sheet 530 remains removably adhered to underside 517 of label sheet 512 as shown in FIG. 18. Adhesive 531 underneath intermediate sheet 530 adheres to the surface of the object in the area of intermediate sheet 530. Adhesive 513 underneath the remaining portion of label sheet 512 that is not covered by intermediate sheet 530 also adheres to the surface of the object. Accordingly, label sheet 512 is substantially permanently adhered to the object over its full surface area. Intermediate sheet 530 is concealed between label sheet 512 and the object.

When the object is to be disposed of, because second segment 528 is removably adhered to release coating 529 of intermediate sheet 530, second segment 528 may be readily separated from first segment 526 at line of weakness 524 and removed from intermediate sheet 530. Second segment 528 then may be disposed of in a fashion that complies with the relevant laws concerning privacy of medical information. Separating second segment 528 from first segment 526 at line of weakness 524 destroys the coherence of the indicia on label sheet 512, as the portion of such indicia appearing within second segment 528 no longer is present. After second segment 528 is removed, first segment 526 remains adhered to the surface of the object, but the portion of the indicia appearing within first segment 526 is made unintelligible though the removal of second segment 528. The object, including first segment 526, also may then be disposed of in a fashion that complies with the relevant laws concerning privacy of medical information.

While this disclosure has been described as having preferred designs, the apparatus and methods according to the present disclosure can be further modified within the scope and spirit of this disclosure. This application is therefore intended to cover any variations, uses, or adaptations of the disclosure using its general principles. For example, any methods disclosed herein and in the appended claims represent one possible sequence of performing the steps thereof. A practitioner may determine in a particular implementation that a plurality of steps of one or more of the disclosed methods may be combinable, or that a different sequence of steps may be employed to accomplish the same results. Each such implementation falls within the scope of the present disclosure as disclosed herein and in the appended claims. Furthermore, this application is intended to cover such departures from the present disclosure as come within known or customary practice in the art to which this disclosure pertains.

We claim:

1. A privacy label comprising:
    a liner sheet, said liner sheet comprising a first surface and a second surface opposite said first surface;
    a label sheet, said label sheet comprising a top surface, an underside surface opposite said top surface, and one or more edges defining a boundary of said label sheet, said top surface adapted for printing indicia thereon, said label sheet comprising a line of weakness defining a first segment and a second segment in said label sheet, said first segment and said second segment together defining an area for printing said indicia thereon, said first segment being, separable from said second segment along said line of weakness, said underside surface of said, label sheet comprising a first adhesive, wherein a portion of said underside surface of said label sheet is releasably bonded to said first surface of said liner sheet;
    an intermediate sheet between said liner sheet and said label sheet, said intermediate sheet being smaller in size than both said liner sheet and said label sheet, said intermediate sheet comprising an upper surface and a lower surface opposite said upper surface, said lower surface of said intermediate sheet comprising a second adhesive, wherein said upper surface of said intermediate sheet is releasably bonded to said underside surface of said label sheet in a position underlying at least all of said second segment of said label sheet, and wherein said lower surface of said intermediate sheet is releasably bonded to said first surface of said liner sheet, wherein said label sheet and said intermediate sheet may be simultaneously separated from said liner sheet, with said intermediate sheet remaining adhered to said underside surface of said second segment of said label sheet and said first adhesive and said second adhesive being exposed;
    wherein when said label sheet and said intermediate sheet together are separated from said liner sheet and adhered to a surface of an object, said lower surface of said intermediate sheet and said underside surface of said first segment of said label sheet are permanently adhered to said surface of said object, and said underside surface of said second segment of said label sheet is removable from said intermediate sheet.

2. The privacy label of claim 1, wherein said label sheet comprises an edge, and wherein said line of weakness originates at said edge of said label sheet and terminate at said same edge of said label sheet.

3. The privacy label of claim 2, wherein when said label sheet and said intermediate sheet together are separated from said liner sheet and adhered to said surface of said object, said intermediate sheet is concealed between said label sheet and said surface of said object.

4. The privacy label of claim 1, wherein said label sheet comprises one or more edges defining a boundary of said label sheet, and wherein said line of weakness does not intersect with any of said one or more edges of said label sheet.

5. The privacy label of claim 4, wherein when said label sheet and said intermediate sheet together are separated from said liner sheet and adhered to said surface of said object, said intermediate sheet is concealed between said label sheet and said surface of said object.

6. The privacy label of claim 1, wherein said intermediate sheet underlies only said second segment of said label sheet.

7. The privacy label of claim 6, wherein when said label sheet and said intermediate sheet together are separated from said liner sheet and adhered to said surface of said object, said intermediate sheet is concealed between said label sheet and said surface of said object.

8. The privacy label of claim 1, wherein said intermediate sheet underlies all of said second segment of said label sheet and only a minority of said first segment of said label sheet.

9. The privacy label of claim 8, wherein when said label sheet and said intermediate sheet together are separated from said liner sheet and adhered to said surface of said object, said intermediate sheet is concealed between said label sheet and said surface of said object.

10. The privacy label of claim 1, wherein when said label sheet and said intermediate sheet together are separated from said liner sheet and adhered to said surface of said object, said intermediate sheet is concealed between said label sheet and said surface of said object.

11. A privacy label comprising:
    a liner sheet, said liner sheet comprising a first surface and a second surface opposite said first surface, said first surface of said liner sheet comprising a first release coating thereon;
    a label sheet, said label sheet comprising a top surface, an underside surface opposite said top surface, and one or more edges defining a boundary of said label sheet, said top surface adapted for printing indicia thereon, said label sheet comprising a line of weakness defining a first segment and a second segment in said label sheet, said first segment and said second segment together defining an area for printing said indicia thereon, said first segment being separable from said second segment along said line of weakness, said underside surface of said label sheet comprising a first adhesive, wherein a first portion of said first adhesive on said underside surface of said label sheet is in contact with said first release coating on said first surface of said liner sheet, thereby making a first bond releasably bonding said underside surface of said label sheet and said first surge of said liner sheet;

an intermediate sheet between said liner sheet and said label sheet, said intermediate sheet being smaller in size than both said liner sheet and said label sheet, said intermediate sheet comprising an upper surface and a lower surface opposite said upper surface, said upper surface having a second release coating thereon and said lower surface having a second adhesive thereon, said intermediate sheet underlying at least all of said second segment of said label sheet, wherein said second release coating on said upper surface of said intermediate sheet is in contact with a second portion of said first adhesive on said underside surface of said label sheet, the interaction of said second release coating and said first adhesive making a second bond releasably bonding said underside surface of said label sheet and said upper surface of said intermediate sheet, and wherein said second adhesive on said lower surface of said intermediate sheet is in contact with said first release coating on said first surface of said liner sheet, the interaction of said second adhesive and said first release coating making a third bond releasably bonding said intermediate sheet and said liner sheet;

wherein said second bond is stronger than said first bond and said third bond, so that when said label sheet is separated from said liner sheet, said intermediate sheet remains adhered to said underside surface of said second segment of said label sheet and said first adhesive and said second adhesive are exposed.

12. The privacy label of claim 11, wherein when said second segment of said label sheet is removed from said first segment of said label sheet, said intermediate sheet remains adhered to said underside surface of said second segment of said label sheet.

13. The privacy label of claim 11, wherein said label sheet comprises an edge, and wherein said line of weakness originates at said edge of said label sheet and terminate at said same edge of said label sheet.

14. The privacy label of claim 11, wherein said label sheet comprises one or more edges defining a boundary of said label sheet, and wherein said line of weakness does not intersect with any of said one or more edges of said label sheet.

15. The privacy label of claim 11, wherein said intermediate sheet underlies only said second segment of said label sheet.

16. The privacy label of claim 11, wherein said intermediate sheet underlies all of said second segment of said label sheet and only a minority of said first segment of said label sheet.

17. The privacy label of claim 11, wherein said first portion of said first adhesive on said underside surface of said label sheet does not overlap said second portion of said first adhesive on said underside surface of said label sheet.

* * * * *